United States Patent
Margaria et al.

(10) Patent No.: US 9,989,646 B2
(45) Date of Patent: Jun. 5, 2018

(54) ELECTRONIC RECEIVER WITH OPEN-LOOP CORRELATORS FOR MITIGATING THE MULTIPATH INTERFERENCE, AND METHOD FOR ESTIMATING AN ALIGNMENT ERROR

(71) Applicant: FINMECCANICA S.P.A., Rome (IT)

(72) Inventors: Davide Margaria, Rome (IT); Emanuela Falletti, Rome (IT); Francesco Parizzi, Rome (IT); Alberto Bagnasco, Rome (IT); Augusto Torchi, Rome (IT)

(73) Assignee: FINMECCANICA—SOCIETÀ PER AZIONI, Rome (IT)

( * ) Notice: Subject to any disclaimer, the term of this patent is extended or adjusted under 35 U.S.C. 154(b) by 296 days.

(21) Appl. No.: 14/908,012

(22) PCT Filed: Jul. 29, 2014

(86) PCT No.: PCT/IB2014/063523
§ 371 (c)(1),
(2) Date: Jan. 27, 2016

(87) PCT Pub. No.: WO2015/015422
PCT Pub. Date: Feb. 5, 2015

(65) Prior Publication Data
US 2016/0170027 A1    Jun. 16, 2016

(30) Foreign Application Priority Data
Jul. 29, 2013    (IT) .............................. TO2013A0638

(51) Int. Cl.
*G01S 19/22* (2010.01)
*G01S 19/18* (2010.01)
(Continued)

(52) U.S. Cl.
CPC .............. *G01S 19/23* (2013.01); *G01S 19/22* (2013.01); *G01S 19/30* (2013.01); *H04B 1/7085* (2013.01); *H04B 1/7075* (2013.01); *H04B 1/711* (2013.01)

(58) Field of Classification Search
CPC .......... G01S 19/23; G01S 19/22; G01S 19/30; G01S 19/18; G01S 13/003; H04B 1/7085
(Continued)

(56) References Cited

U.S. PATENT DOCUMENTS 5,493,588 A    2/1996 Lennen
2002/0101912 A1*  8/2002 Phelts .................... G01S 19/22
375/148

(Continued)

FOREIGN PATENT DOCUMENTS

WO    WO 01/39698    6/2001

OTHER PUBLICATIONS

Dierendonck et al. "Evaluation of GNSS Receiver Correlation Processing Techniques for Multipath and Noise Mitigation" Proceedings of the Ion National Technical Meeting, The Institute of Navigation, Jan. 14, 1997, pp. 207-215.
(Continued)

*Primary Examiner* — Harry K Liu
(74) *Attorney, Agent, or Firm* — Dorsey & Whitney LLP

(57) ABSTRACT

Described herein is a receiver for a navigation system, which receives a navigation signal modulated with a pseudorandom sequence along a line-of-sight path and reflected paths. The receiver includes a delay-locked loop, which generates a local sequence, and a first correlator and a second correlator, which operate in open-loop mode and generate a first correlation signal.

13 Claims, 11 Drawing Sheets

(51) Int. Cl.
  *G01S 19/23* (2010.01)
  *G01S 19/30* (2010.01)
  *H04B 1/7085* (2011.01)
  *H04B 1/7075* (2011.01)
  *H04B 1/711* (2011.01)
(58) Field of Classification Search
  USPC .................................................. 342/357.61
  See application file for complete search history.

(56) References Cited

U.S. PATENT DOCUMENTS

| | | | |
|---|---|---|---|
| 2007/0211793 A1* | 9/2007 | Han | G01S 19/22 |
| | | | 375/150 |
| 2010/0104048 A1* | 4/2010 | Chen | G01S 19/30 |
| | | | 375/340 |
| 2010/0208775 A1* | 8/2010 | Weill | G01S 19/37 |
| | | | 375/150 |

OTHER PUBLICATIONS

International Search Report and Written Opinion from International Application No. PCT/IB2014/063523 dated Nov. 6, 2014.
International Preliminary Report on Patentability from International Application No. PCT/IB2014/063523 dated Jun. 30, 2015.

* cited by examiner

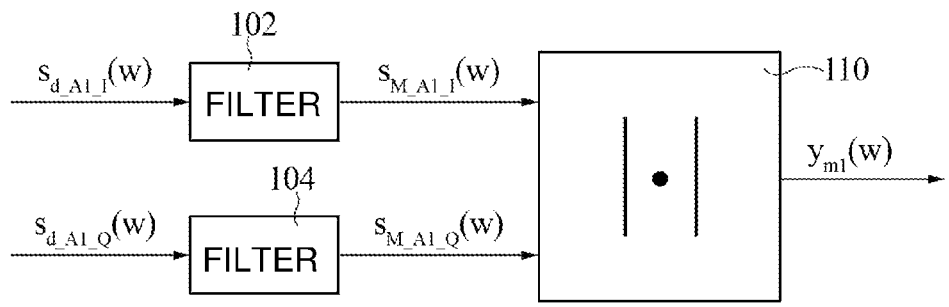
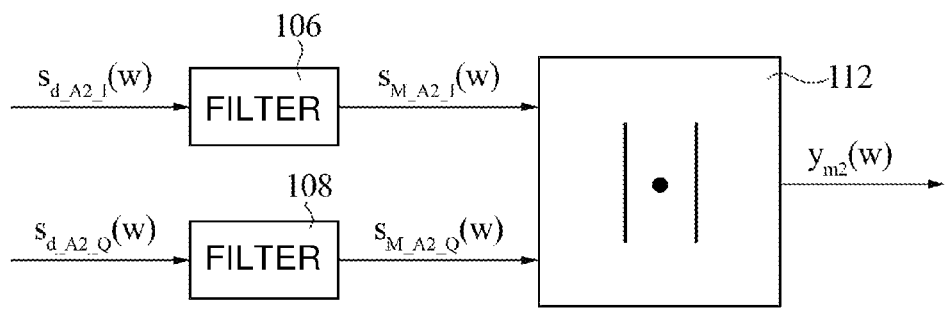
FIG. 9
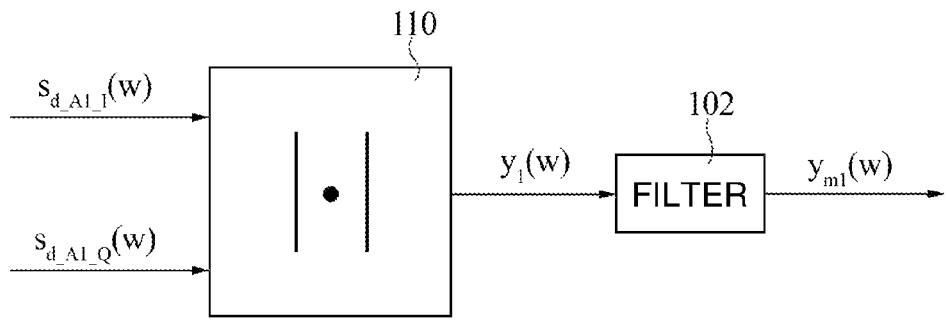
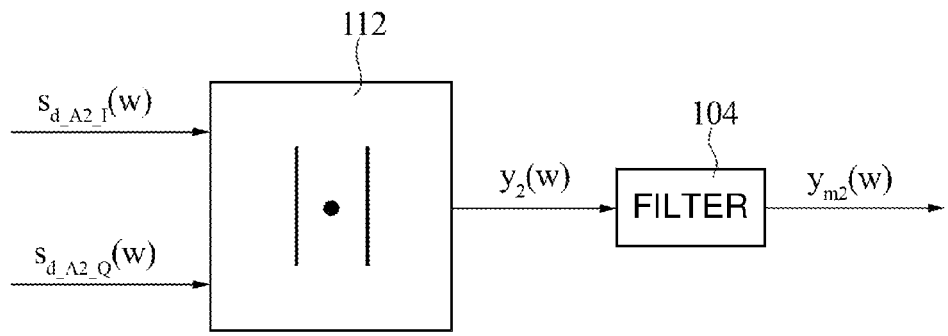
FIG. 10

ELECTRONIC RECEIVER WITH OPEN-LOOP CORRELATORS FOR MITIGATING THE MULTIPATH INTERFERENCE, AND METHOD FOR ESTIMATING AN ALIGNMENT ERROR

TECHNICAL FIELD

The present invention relates to an electronic receiver and to a method for estimating an alignment error. In particular, the present invention relates to an electronic receiver for a global navigation satellite system (GNSS), which comprises correlators operating in open-loop mode.

BACKGROUND ART

As is known, the receivers used in global navigation satellite systems, such as for example the GPS (Global Positioning System), determine their global position on the basis of signals received by satellites forming part of a constellation.

For instance, the most recent satellites forming part of the GPS constellation transmit signals using three carriers denoted as L1, L2, and L5, where the carrier L1 has a frequency of 1575.42 MHz, the carrier L2 has a frequency of 1227.60 MHz, and the carrier L5 has a frequency of 1176.45 MHz.

Each carrier is of a sinusoidal type and is modulated by one or more signals (channels), each of which is formed by at least one pseudo-random sequence (Pseudo-Random Noise—PRN), which may be periodic or nonperiodic and is formed by a (periodic or nonperiodic) binary sequence appropriately modulated by a waveform that repeats periodically. In particular, modulation is obtained on the basis of so-called "spread spectrum" techniques and enables transmission of possible navigation data.

The ones and zeros present in the PRN sequences are generally referred to by the expression "code chips" or simply "chips", whereas the transitions from 1 to 0 and vice versa are generally referred to as "chip transitions". In technical jargon, the PRN sequences are also referred to as "ranging codes", since they enable estimation of the pseudo-ranges between receiver and satellites.

Each GPS satellite uses a very precise PRN sequence of its own for each channel transmitted that is distinct from that of the other satellites; for this reason, the receiver can associate the signal received with the satellite that has emitted it, after determining which PRN sequence is included in the signal.

The receiver calculates the difference between the instant at which the satellite has transmitted the signal, said information being contained in the signal itself, and the instant at which the receiver has received the signal. On the basis of this difference in time, the receiver calculates its own distance from the satellite, which is known as "pseudo-range". Using the pseudo-ranges for at least four satellites, the receiver is able to calculate its own global position.

To determine the difference in time between the instant at which the satellite transmits the signal and the instant at which the receiver receives it, the receiver synchronizes a PRN sequence generated locally with the PRN sequence present in the signal received. This synchronization is obtained by means of alignment of the code chips present in the sequences. In this way, the receiver determines the degree of time deviation of the PRN sequence generated locally with respect to the "GNSS time", i.e., the time scale used by the satellite for generating its own PRN sequence, and calculates the pseudo-range.

The more precisely the receiver aligns the PRN sequence generated locally with the PRN sequence present within the signal received, the more precisely the GPS receiver can determine the time deviation between these sequences, the pseudo-range and, consequently, its own global position.

The operations of synchronization typically include acquisition of the PRN sequence of the satellite and tracking thereof. To acquire the PRN sequence, typically the receiver makes a series of correlation measurements with steps less than or equal to half a chip. Once the sequence has been acquired, the receiver tracks it, typically using a so-called delay-locked loop (DLL). In addition to this, the receiver is able to track the variations of the frequency and of the phase of the carrier used by the satellite for transmitting the PRN sequence and the navigation data. To do this, the receiver typically uses a phase-locked loop (PLL).

An example of receiver is illustrated in FIG. 1. In particular, FIG. 1 shows a receiver 1, which comprises an antenna 2, an input stage 4, and a stage for numeric processing of the signal 6, referred to as hereinafter as to "tracking stage" 6.

The antenna 2 is designed to receive navigation signals and is connected to the input stage 4, which, as illustrated in FIG. 2, is formed by a matching oscillator 7, an input amplifier 8, a matching multiplier (also known as "mixer") 9, a bandpass filter 10, an automatic-gain-control amplifier 12, and an analog-to-digital (A/D) converter 14.

The input amplifier 8, the matching multiplier 9, the bandpass filter 10, the automatic-gain-control amplifier 12, and the A/D converter 14 are arranged in cascaded fashion and are electrically connected together.

The matching multiplier 9, in addition to having a first input connected to the output of the input amplifier 8, has a second input connected to the output of the matching oscillator 7, which operates in open-loop mode.

In use, if we denote by "analog input signal $s_i(t)$" the electrical signal that is generated by the antenna 2 as a function of one or more navigation signals (if present) and is supplied to the input amplifier 8, the A/D converter 14 supplies a sampled input signal $s_i(n)$, at output from the input stage 4. In particular, the A/D converter 14 operates at a sampling frequency $f_s$.

In practice, the input stage 4 is a heterodyne receiving stage and may contain further electronic components. Furthermore, the input stage 4 is such that the spectrum of the sampled input signal $s_i(n)$ is a replica centred at a so-called "intermediate frequency" $f_i$ of the spectrum of the analog input signal $s_i(t)$.

The tracking stage 6 comprises a carrier generator 20, a first input multiplier 22a and a second input multiplier 22b, a first subchannel filter 23a and a second subchannel filter 23b, and a first correlation subchannel 21a and a second correlation subchannel 21b. Furthermore, the tracking stage 6 comprises a discriminator 30, a discrimination filter 32, and a local waveform generator 34. In practice, the tracking stage 6 forms a so-called "delay-locked loop" (DLL).

The carrier generator 20 has a first output and a second output and generates, at a frequency equal to the sampling frequency $f_s$, samples of sinusoidal signals. In particular, respectively present on the first output and on the second output of the carrier generator 20 are a first local signal $s_{cos}(n)$ and a second local signal $s_{sen}(n)$, which are real and phase-shifted with respect to one another by 90°; in greater detail, the first and second local signals $s_{cos}(n)$, $s_{sen}(n)$ are formed by samples given by cos $(2\pi \cdot f_{loc} \cdot n/f_s)$ and sen $(2\pi \cdot f_{loc} \cdot n/f_s)$, respectively, where $f_{loc}$ is a local frequency, or else by their approximations.

The first input multiplier 22a has a first input and a second input, which are connected to the output of the A/D converter and to the first output of the carrier generator 20, respectively.

The second input multiplier 22b has a first input and a second input, which are connected to the output of the A/D converter and to the second output of the carrier generator 20, respectively.

The first and second subchannel filters 23a, 23b are both of a numeric and low-pass type and have inputs connected, respectively, to the outputs of the first and second input multipliers 22a, 22b.

As illustrated in FIG. 3, the tracking stage 6 includes three correlators, referred to hereinafter as "prompt correlator" P, "early correlator" E, and "late correlator" L.

Each one of the three correlators, the prompt correlator P, the early correlator E, and the late correlator L comprises a respective in-phase part 24a, which forms the first correlation subchannel 21a, and a respective quadrature part 24b, which forms the second correlation subchannel 21b. The local waveform generator 34 is shared among the prompt correlator P, the early correlator E, and the late correlator L.

In detail, each in-phase part 24a comprises a respective correlation multiplier 26a and a respective accumulator 28a.

The correlation multiplier 26a has a first input and a second input, the first input being connected to the output of the first subchannel filter 23a; moreover, the correlation multiplier 26a has an output, which is connected to the input of the corresponding accumulator 28a.

Each accumulator 28a has a respective output, which is connected at input to the discriminator 30. Furthermore, the discriminator 30 has an output, which is connected to the input of the discrimination filter 32, the output of which is connected to the input of the local waveform generator 34. In turn, the local waveform generator 34 has three outputs; each output of the local waveform generator 34 is connected to the second input of a corresponding correlation multiplier 26a and thus forms one from among the prompt correlator P, the early correlator E, and the late correlator L.

Each quadrature part 24b of the prompt correlator P, early correlator E, and late correlator L comprises a respective correlation multiplier and a respective accumulator, which are designated, respectively, by 26b and 28b; the correlation multiplier 26b has a first input connected to the output of the second input filter 23b and a second input connected to one of the three outputs of the local waveform generator 34.

The outputs of the accumulators 28b of the second correlation subchannel 21b are supplied at input to the discriminator 30.

In practice, the first and second correlation subchannels 21a, 21b are the same as one another but receive at input different samples. Furthermore, considering any one of the three correlators, the prompt correlator P, the early correlator E, and the late correlator L, the respective in-phase and quadrature parts 24a, 24b share the same output of the local waveform generator 34. In other words, the second inputs of the correlation multipliers of the in-phase part and quadrature part of the correlator considered are connected to the same output of the local waveform generator 34.

Operatively, assuming that the antenna 2 receives a navigation signal that is modulated with a first sequence PRN1 and has a carrier at a first frequency $f_{c1}$, the first and second local signals $s_{cos}(n)$ cos $s_{sen}(n)$ have a frequency equal to the aforementioned intermediate frequency $f_i$, even though in these conditions it is generally stated that the first and second local signals $s_{cos}(n)$, $s_{sen}(n)$ are locked to the carrier of the navigation signal, which, as has been said, has a frequency equal to the first frequency $f_{c1}$. The local frequency $f_{loc}$ is hence found to be equal to the intermediate frequency $f_i$.

Even though it is not illustrated in FIG. 1, in order to generate the first and second local signals $s_{cos}(n)$, $s_{sen}(n)$, the carrier generator 20 typically comprises a discriminator of its own, a filter, and a digitally controlled oscillator, which are connected in sequence, the input of the discriminator being connected to one or more of the outputs of the accumulators of the first and second correlation subchannels 21a, 21b so as to form a phase-locked loop.

The first and second input multipliers 22a, 22b supply, respectively, a first multiplication signal $s_{mI}(n)$ and a second multiplication signal $s_{mQ}(n)$. Furthermore, the first and second input filters 23a, 23b supply, respectively, an in-phase signal $I(n)$ and a quadrature signal $Q(n)$, the samples of which are real. The in-phase signal $I(n)$ and the quadrature signal $Q(n)$ represent the in-phase and quadrature components of the sampled input signal $s_i(n)$, and are hence a function, respectively, of the in-phase and quadrature components of the analog input signal $s_i(t)$. From another standpoint, the in-phase signal $I(n)$ and the quadrature signal $Q(n)$ represent the outcome of an operation of demodulation of the navigation signal; moreover, typically the navigation signal is alternatively quadrature modulated or, more frequently, in-phase modulated with the first sequence PRN1; consequently, the quadrature signal $Q(n)$ or, more frequently, the in-phase signal $I(n)$ represent the same first sequence PRN1, demodulated starting from the navigation signal.

The local waveform generator 34 supplies, on each of its own outputs, a corresponding local signal, of a digital and pseudo-random type, which is in general referred to as "correlation sequence". For instance, each correlation sequence may be formed by the periodic repetition of one and the same basic PRN sequence, understood as set of "code chips", modulated with an appropriate waveform (for example, a gate function, in the case of signals with modulation of a BPSK type, or else with more complex waveforms in the case of modulations BOC, $BOC_c$, CBOC, TMBOC, AltBOC, etc.). The samples of the correlation sequences are supplied at the sampling frequency $f_s$.

The correlation sequences are misaligned in time with respect to one anther. In particular, the correlation sequence of the prompt correlator P, which in FIG. 3 is designated by $cr_0(n)$, and is referred to as "local sequence", represents the sequence to be time aligned to the one contained in the navigation signal received.

The correlation sequence of the early correlator E, which in FIG. 3 is designated by $cr_{-1}(n)$, and which is referred to as "early replica" of the local sequence, has a time advance with respect to the local sequence equal to a phase shift $\Delta$.

The correlation sequence of the late correlator L, which in FIG. 3 is designated by $cr_1(n)$, and which is referred to as "late replica" of the local sequence, has a time delay with respect to the local sequence equal to the phase shift $\Delta$.

From another standpoint, each of the three correlators, the prompt correlator P, the early correlator E, and the late correlator L, comprises a respective in-phase part 24a, which operates on the in-phase component of the sampled input signal $s_i(n)$, and a quadrature part 24b, which operates on the quadrature component of the sampled input signal $s_i(n)$.

In greater detail, with reference, for example, to the first correlation subchannel 21a, assuming an index $z=-1, 0, 1$ to identify individually the in-phase parts 24a of the prompt correlator P, the early correlator E, and the late correlator L that form it, and if by "first-subchannel intermediate signal $s_{cI,z}(n)$" we designate, given the z-th in-phase part 24a, the signal present on the output of the corresponding correlation multiplier 26a, the corresponding accumulator 28a is designed to add a number K of samples of the first-subchannel intermediate signal $s_{cI,z}(n)$ and to divide the result of this addition by the number K itself, thus determining a sample of a corresponding first-subchannel correlation signal $s_{dI,z}(w)$. FIG. 3 adopts a notation such that the symbols $s_{cI,-1}(n)$, $s_{cI,0}(n)$ and $s_{cI,1}(n)$ refer to the early correlator E, the prompt correlator P, and the late correlator L, respectively.

In practice, the accumulators 28a function as "integrate and dump" blocks. Furthermore, the samples of the first-subchannel correlation signals $s_{dI,z}(w)$ are supplied at a frequency equal to $f_s/K$, i.e., the index w can be interpreted as the ratio n/K rounded to the largest previous integer. In other words, given any accumulator 28a and given a first sample and a second sample of one and the same first-subchannel correlation signal $s_{dI,z}(w)$, the first sample is a function of a first set of K samples of the corresponding first-subchannel intermediate signal $s_{cI,z}(n)$, whereas the second sample is a function of a second set of K samples of said first-subchannel intermediate signal $s_{cI,z}(n)$, the samples of the second set being different from the samples of the first set.

Operation of the quadrature parts 24b of the second correlation subchannel 21b is the same as operation of the in-phase parts 24a of the first correlation subchannel 21a, except that, in the present treatment, given the z-th quadrature part 24b, we designate by "second-subchannel intermediate signal $s_{cQ,z}(n)$" the signal present on the output of the corresponding correlation multiplier 26b. In addition, given again the z-th quadrature part 24b of the second correlation subchannel 21b, we designate by "second-subchannel correlation signal $s_{dQ,z}(w)$" the signal present on the output of the corresponding accumulator 28b.

The discriminator 30 receives at input the three first-subchannel correlation signals $s_{dI,z}(w)$ and the three second-subchannel correlation signals $s_{cQ,z}(w)$, as a function of which it generates, on its own output, a driving signal $s_p(w)$ of a numeric type, with samples issued at a frequency, for example, of $f_s/K$. The driving signal $s_p(w)$ is filtered by the discrimination filter 32, which is also of a numeric low-pass type, in such a way as to supply a filtered driving signal $s_{pf}(w)$. The filtered driving signal $s_{pf}(w)$ is supplied at input to the local waveform generator 34.

In detail, the discriminator 30 determines points of the so-called correlation function, at a frequency equal to $f_s/K$; i.e., it updates the points of the correlation function at each integration period $T=K/f_s$.

In greater detail, for each integration period T, the discriminator 30 determines a corresponding vector, formed by three elements. More in particular, considering an integration period T, and considering any element between the three elements of the corresponding vector, said element may, for example, be equal to i) the value of the corresponding first-subchannel correlation signal $s_{dI,z}(w)$, or else ii) the square root of the sum of the square of the value of the corresponding first-subchannel correlation signal $s_{dI,z}(w)$ and the square of the value of the corresponding second-subchannel correlation signal $s_{dQ,z}(w)$. In case i), the discriminator 30 is said to be coherent, whereas in case ii) the discriminator 30 is said to be non-coherent.

In practice, for each integration period T, the corresponding vector contains the three points of the correlation function. FIGS. 4a and 4b show two examples of ideal correlation functions, on the hypothesis that the navigation signal is BOC(1,1)-modulated and in the case of coherent and non-coherent discriminator, respectively; in both cases, the abscissae identify the delays with respect to the peak of the correlation function, which occurs, ideally, when the local sequence is time aligned with the sequence contained in the navigation signal. Furthermore, illustrated in each of FIGS. 4a and 4b are the three points of the vector, which are designated by VE, VP, and VL, respectively. In particular, the point VP is the point of the correlation function calculated on the basis of the values of the first-subchannel and second-subchannel correlation signals for the prompt correlator P, which are designated, respectively, by $s_{dI,0}(w)$ and $s_{dQ,0}(w)$. The point VE is the point of the correlation function calculated on the basis of the values of the first-subchannel and second-subchannel correlation signals for the early correlator E, which are designated, respectively, by $s_{dI,-1}(w)$ and $s_{dQ,-1}(w)$. The point VL is the point of the correlation function calculated on the basis of the values of the first-subchannel and second-subchannel correlation signals for the late correlator L, which are designated, respectively, by $s_{dI,1}(w)$ and $s_{dQ,1}(w)$.

The points of the correlation function represent correlation measurements, i.e., measurements indicating the difference between the first sequence PRN1 of the navigation signal received by the antenna 2 and corresponding time-shifted replicas.

This said, the discriminator 30 operates in such a way that the local sequence is kept time-aligned to the first sequence PRN1, as present in the navigation signal received by the antenna 2, which is referred to also as "PRN sequence received along the line-of-sight (LOS) path". For this purpose, the discriminator 30 may, for example, generate the driving signal $s_p(w)$ in such a way that it is proportional to the difference between the points VE and VL of the correlation function and hence is proportional to the time misalignment between the local sequence and the PRN sequence received along the line-of-sight path. Furthermore, the local waveform generator 34 operates in such a way as to minimize the driving signal $s_p(w)$, appropriately translating the local sequence in time, as well as, to the same extent, the early replica of the local sequence and the late replica of the local sequence.

As illustrated in greater detail in FIG. 5, in forming the navigation signal, the satellite (designated by 40) generates the first sequence PRN1, in a synchronous way with a clock 42 of its own, which is synchronous with the GNSS time (for example, the GPS time scale, i.e., the so-called "GPS time"). In turn, the receiver 1 has a clock 44 of its own, which only ideally is synchronized with the GNSS time. Furthermore, the local waveform generator 34 generates the local sequence in a synchronous way with its own clock, but shifts it by a delay D with respect to the latter, this delay D being such that the correlation between the local sequence and the PRN sequence received along the line-of-sight path is maximum. The delay D is thus a function of the difference in time between the instant of transmission of the first sequence PRN1, referred to the clock 42 of the satellite 40, and the instant of reception of the first sequence PRN1, referred to the clock 44 of the receiver 1. Furthermore, the delay D can be used for calculating the pseudo-range between the satellite 40 and the receiver 1.

Examples that represent operation of the DLL are illustrated in FIGS. 6a-6d, which show for simplicity of representation individual chips of the PRN sequence received along the line-of-sight path, of the local sequence $cr_0(n)$, of the early replica of the local sequence $cr_{-1}(n)$ and of the late replica of the local sequence $cr_1(n)$. In each of FIGS. 6a-6d, the correlation function is normalized and is represented in a Cartesian system, the abscissae of which indicate the time delay, expressed in fractions of chip, of the local sequence, or replica of the local sequence, with respect to the PRN sequence received along the line-of-sight path. Furthermore, the time delay is normalized in such a way that the maximum of the correlation function occurs at point zero of the abscissae; the time delay is hence normalized as a function of the aforementioned delay D, which thus enables alignment of the local sequence with the PRN sequence received along the line-of-sight path. In other words, the abscissae are normalized with respect to the time of propagation of the navigation signal along the line-of-sight path.

In practice, in the case where the antenna 2 receives only the navigation signal, along the line-of-sight path present between the satellite 40 that has generated the navigation signal and the antenna 2, the discriminator 30 operates in such a way that what is represented by way of example in FIG. 6c is obtained. Consequently, there occurs a maximization of the values of the samples of the first-subchannel correlation signal $s_{dI,0}(w)$ of the prompt correlator P. In these conditions, there is, in fact, alignment between the local sequence and the PRN sequence received along the line-of-sight path; in particular, the local sequence is said to be aligned with the main peak of the correlation function and the prompt correlator P is said to be locked to the main peak. Consequently, the receiver 1 demodulates properly the data contained in the navigation signal and determines properly the pseudo-range from the satellite 40, this information then being used in the subsequent steps that lead to determination of the global position of the receiver 1.

Instead, when the antenna 2 receives, through multipaths, also reflected replicas of the navigation signal, on account of these replicas there may occur a misalignment between the local sequence and the PRN sequence received along the line-of-sight path. This is due to the fact that the presence of the multipaths causes a sort of deformation of the correlation function with respect to the case where there are no multipaths. In this connection, in the presence of multipaths, the correlation function calculated by the discriminator 30 regards the signal formed by the set of all the replicas of the first sequence PRN1 as received by the receiver 1 along all the paths that reach the receiver 1 itself. In particular, the correlation function determined by the discriminator 30 regards the combination (algebraic sum) of all the replicas of the first sequence PRN1 received by the receiver 1 and of the PRN sequence received along the line-of-sight path.

The presence of multipaths may cause an asymmetry of the correlation function and/or alter the position of the maximum of the correlation function. It is thus possible that the maximum of the correlation function calculated by the discriminator 30 occurs for an erroneous time alignment between the local sequence and the PRN sequence received along the line-of-sight path. It is moreover possible for the local sequence to be aligned with a secondary (side) peak of the correlation function. In particular, the likelihood of alignment on a secondary peak increases as the number of secondary peaks within the correlation function increases, and moreover as the amplitudes of the secondary peaks increase with respect to the amplitude of the main peak.

There thus occurs an alignment error between the local sequence and the PRN sequence received along the line-of-sight path, i.e., an error in the determination of the delay with which it is necessary to shift the local sequence so as to align it to the PRN sequence received along the line-of-sight path; this error has repercussions on the calculation of the pseudo-range and, consequently, on the determination of the global position of the receiver 1. In particular, the pseudo-range may prove affected by errors in the region of several meters.

In order to mitigate the effects of multipaths, there have been proposed numerous techniques. Some techniques aim at preventing the reflected signals from possibly reaching the receiver, whereas others envisage processing the signals received so as to mitigate the effect of the multipaths.

The article "Evaluation of GNSS Receiver Correlation processing Techniques for Multipath and Noise Mitigation", by A. J. Van Dierendonck and M. S. Braasch, Proceedings of the 1997 National Technical Meeting of the Institute of Navigation (ION-NTM '97), Jan. 14-16, 1997, Santa Monica, Calif., U.S.A., describes, among other techniques, the so-called "tracker E1/E2", which envisages having, for each correlation subchannel, two additional correlators, which are connected to the discriminator and operate in closed-loop mode. Thanks to the presence of the additional correlators, the discriminator endeavours to track a point of the correlation function that is not distorted by the presence of the multipaths. This technique guarantees good performance; however, the DLL thus implemented is particularly vulnerable to thermal noise; hence, the performance decays in the presence of faded navigation signals.

The document No. WO01/39698 describes a method of multipath mitigation, which comprises the steps of locating a point of an ideal correlation function, invariant with respect to possible multipaths, and measuring the distance of this point from a DLL. The same point is moreover located on a real correlation function, and the method further comprises the step of measuring the distance between said point and the DLL; the difference between the two distances measured represents the tracking error caused by the multipaths.

DISCLOSURE OF INVENTION

The aim of the present invention is hence to provide a receiver that will solve at least in part the drawbacks of the known art.

According to the present invention, a receiver and an estimation method are provided as defined in the annexed claims.

BRIEF DESCRIPTION OF THE DRAWINGS

For a better understanding of the invention, embodiments thereof are now described purely by way of non-limiting example and with reference to the annexed drawings, wherein.

Figure 7:
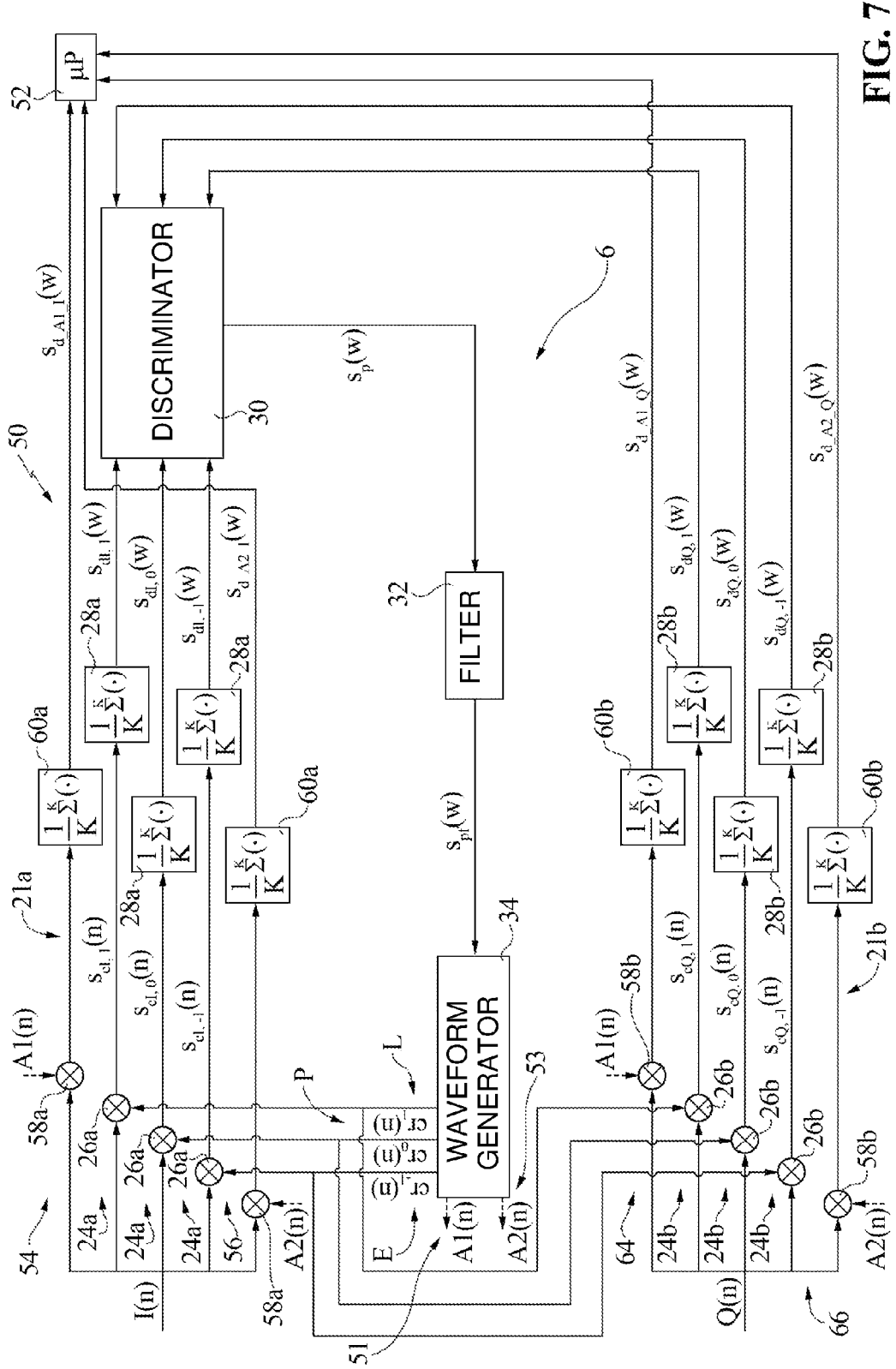
Figure 8A:
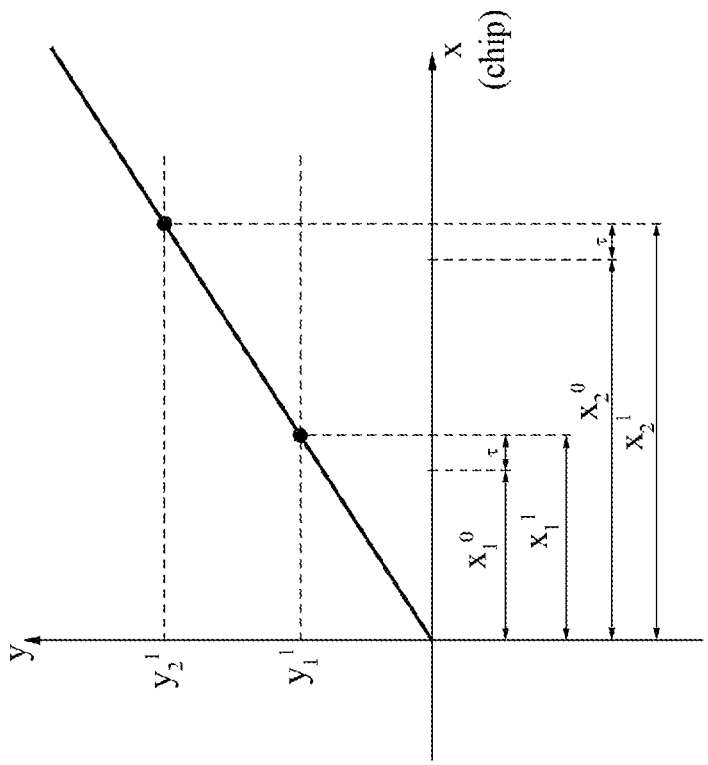
Figure 8B:
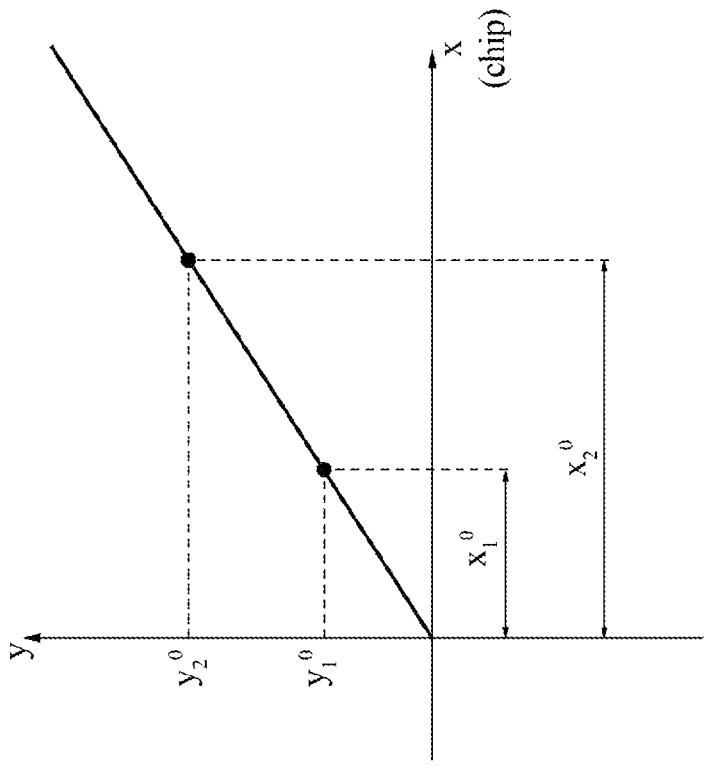
Figure 11:
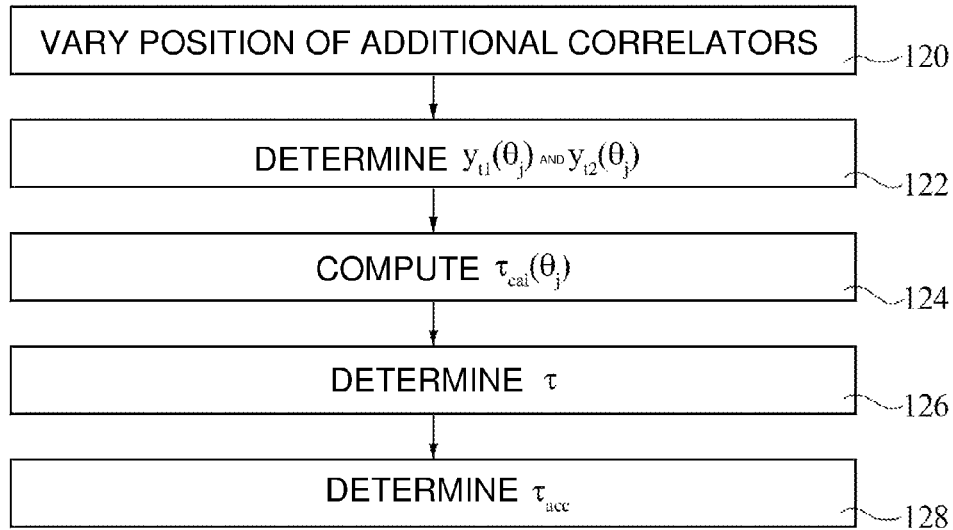
Figure 12:
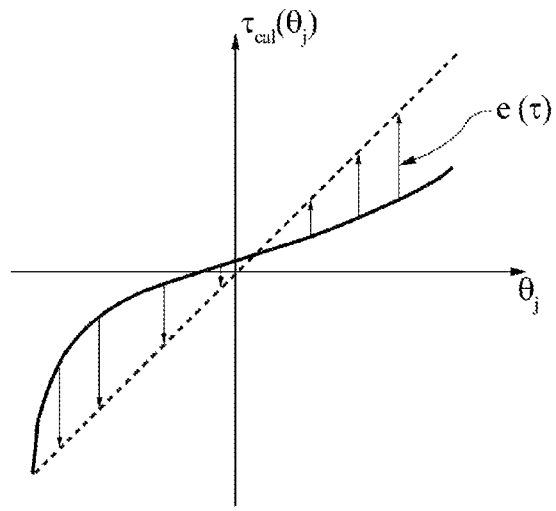
Figure 14:
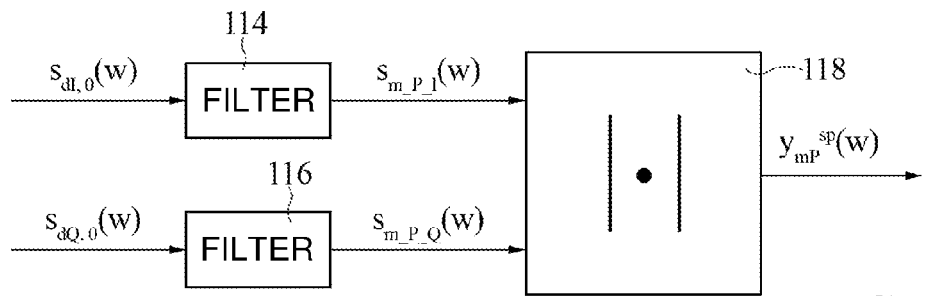
Figure 13:
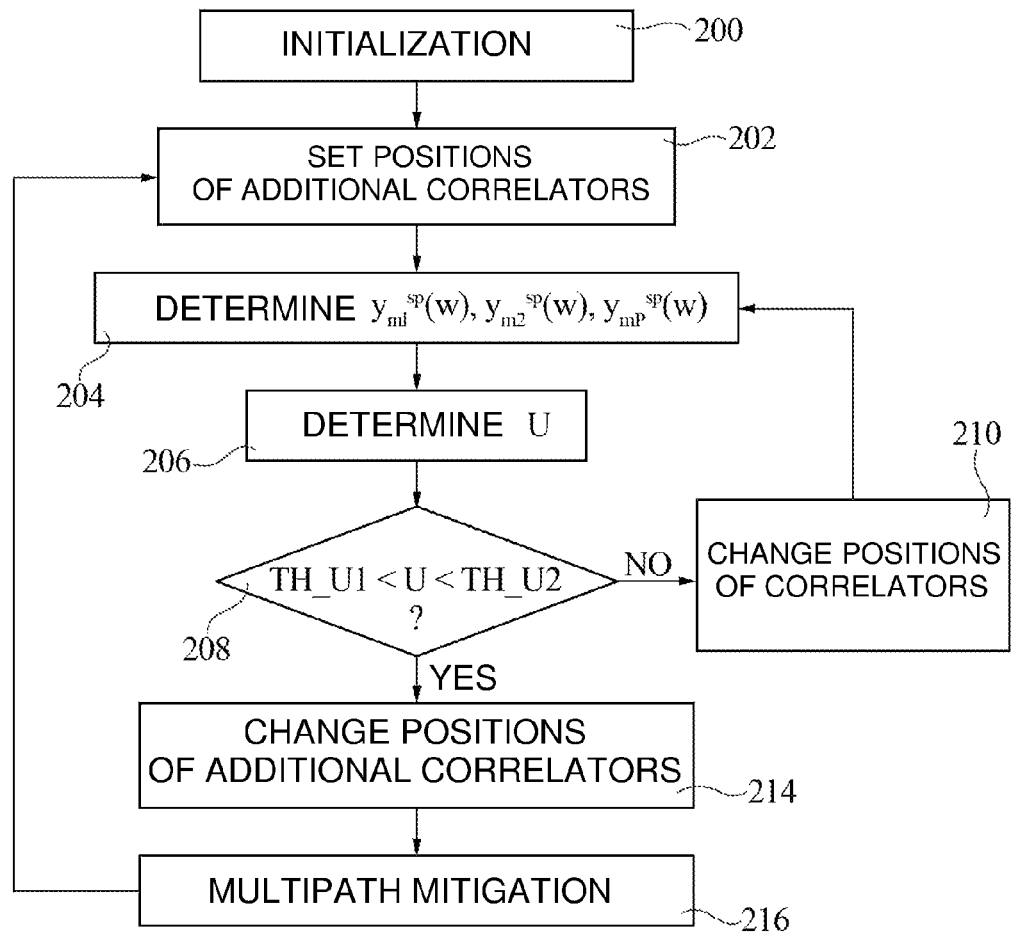

each of FIGS. 6a-6d shows the mutual time arrangement of individual chips of a PRN sequence received by a receiver and of three PRN sequences generated locally by the receiver, as well as the corresponding correlation function (normalized to one) and the arrangement with respect to the latter of the three PRN sequences generated locally;

FIG. 7 shows a block diagram of a portion of the present receiver;

FIGS. 8a-8b show portions of correlation functions, represented in a cartesian system, and positions of correlators with respect to said correlation functions;

FIGS. 9, 10, and 14 show block diagrams of filtering operations implemented by embodiments of the present receiver;

FIG. 11 shows a flowchart of operations performed by an embodiment of the present receiver during a calibration step and a subsequent operating step;

FIG. 12 shows the plot of an example of calibration function in a cartesian system; and FIG. 13 shows a flowchart of operations performed by an embodiment of the present receiver.

BEST MODE FOR CARRYING OUT THE INVENTION

Basically, the present receiver envisages the availability of additional correlators, which operate in open-loop mode and enable determination of an estimate of the error of the alignment between the local sequence and the PRN sequence received along the line-of-sight path. This estimate can be used for correcting the pseudo-range value. Consequently, no correction of the distortion of the correlation function is implemented, such corrections being characterized in general by a high computational complexity.

More in particular, the present receiver is based upon the fact that, considering a point $O_x$ of the correlation function of a signal modulated with a PRN sequence and received through the line-of-sight path, said point $O_x$ is not distorted by the presence of a possible reflected path if the delay of the latter with respect to the line-of-sight path, i.e., the difference between the respective propagation times, is longer than a threshold delay $\tau_{min}$, which is equal to $\tau_{min}=T_{chip}-t_{Ox}$, where $T_{chip}$ is the duration of an individual chip, and $t_{Ox}$ is equal to the time distance of the point $O_x$ with respect to the maximum of the correlation function in the absence of multipaths. In other words, around the point $O_x$, the correlation function of the signal given by the combination of the PRN sequence received along the line-of-sight path and the replica received along the reflected path coincides with the correlation function of the PRN sequence received along the line-of-sight path alone.

The threshold delay $\tau_{min}$ can also be expressed in fractions of chip, dividing the previous expression by $T_{chip}$, in which case it is equal to $\tau_{min}^{(chip)}=1-s_{Ox}$, where $s_{Ox}$ is equal to the spacing, i.e., to the delay in fractions of chip, of the point $O_x$ with respect to the maximum of the correlation function in the absence of multipaths. However, as the modulus of the spacing $s_{Ox}$ increases, the signal-to-noise ratio that characterizes the same point $O_x$ decreases.

Figure 1:
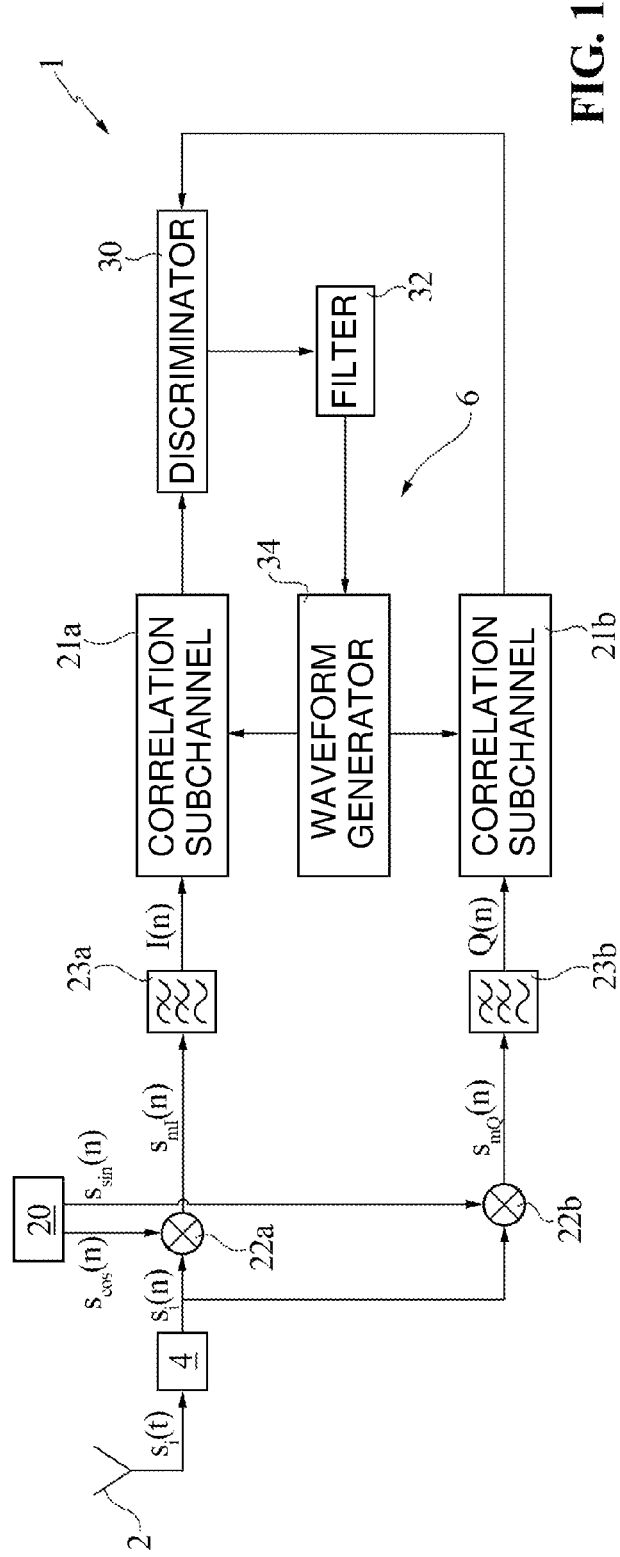
FIG. 1 shows a block diagram of a receiver of a global navigation satellite system of a known type.
Figure 2:
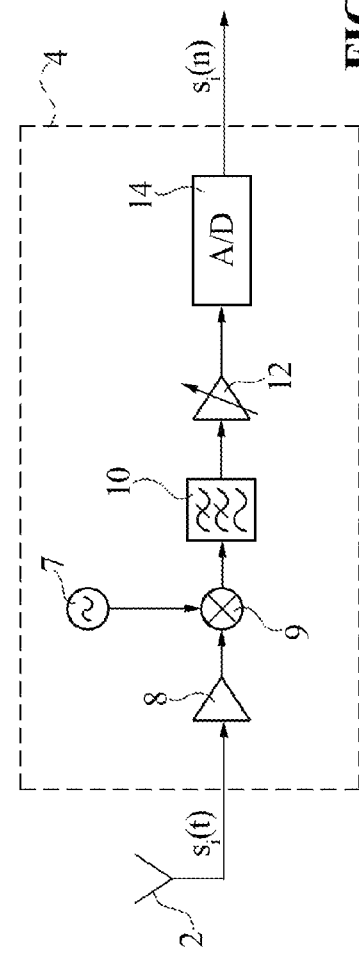
FIGS. 2 and 3 show block diagrams of portions of the receiver illustrated in FIG. 1.
Figure 3:
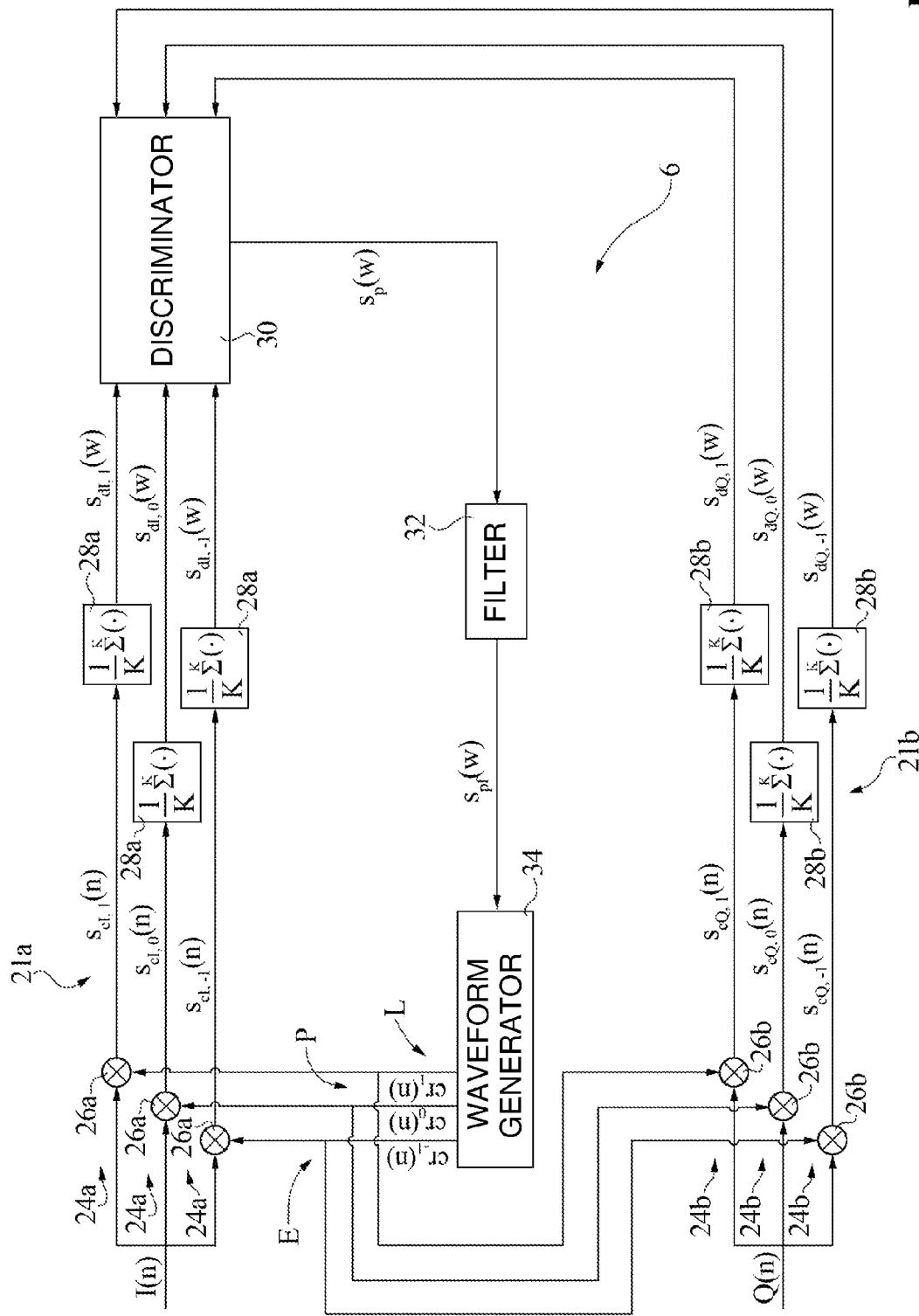

This said, FIG. 7 shows a receiver 50, which is now described as regards just the differences with respect to the receiver 1 illustrated in FIG. 1. Furthermore, elements of the receiver 50 already present in the receiver 1 are designated by the same references. It is moreover assumed, without this implying any loss of generality, that the aforementioned time Δ, i.e., the modulus of the spacing between the local sequence ($cr_0(n)$) and the early and late replicas of the local sequence ($cr_{-1}(n)$ and $cr_1(n)$) is shorter than the duration of a single chip. It is moreover assumed, without this implying any loss of generality, that the discriminator 30 is of a non-coherent type.

In detail, the receiver 1 comprises a processing unit 52. Furthermore, the receiver 50 comprises a first additional correlator 51 and a second additional correlator 53, which, in an operating mode referred to as "mitigation of the multipath effects", are controlled in open-loop mode; i.e., the respective outputs do not affect the respective inputs.

In greater detail, the first additional correlator 51 comprises an in-phase part 54, which forms the first correlation subchannel 21a, and a quadrature part 64, which forms the second correlation subchannel 21b. The second additional correlator 53 comprises a respective in-phase part 56, which forms the first correlation subchannel 21a, and a respective quadrature part 66, which forms the second correlation subchannel 21b.

Each of the in-phase part 54 of the first additional correlator 51 and the in-phase part 56 of the second additional correlator 53 comprises a respective correlation multiplier 58a and a respective accumulator 60a connected together. The outputs of the accumulators 60a of the in-phase parts of the first and second additional correlators 51, 53 are connected at input to the processing unit 52, instead of to the discriminator 30.

The correlation multiplier 58a of the in-phase part 54 of the first additional correlator 51 has a first input and a second input, the first input being connected to the output of the first subchannel filter 23a so as to receive the in-phase signal I(n), the second input being connected to the local waveform generator 34 so as to receive a first additional signal A1(n), generated by the local waveform generator 34 itself.

The correlation multiplier 58a of the in-phase part 56 of the second additional correlator 53 has a first input and a second input, the first input being connected to the output of the first subchannel filter 23a so as to receive the in-phase signal I(n), the second input being connected to the local waveform generator 34 so as to receive a second additional signal A2(n), generated by the local waveform generator 34 itself.

As mentioned, in addition to the local sequence $cr_0(n)$, the early replica of the local sequence $cr_{-1}(n)$, and the late replica of the local sequence $cr_1(n)$, the local waveform generator 34 hence generates the first additional signal A1(n) and the second additional signal A2(n), which are also replicas of the local sequence, with respect to which they are in advance, respectively, by an amount $s_{A1}$ and an amount $s_{A2}$, which are normalized with respect to the chip time $T_{chip}$ and are given by $$s_{A1}=(\tau_p-\tau_{A1})/T_{chip}>0,\ s_{A1}<1,\text{ and}$$

$$s_{A2}=(\tau_p-\tau_{A2})/T_{chip}>0,\ s_{A2}<1 \qquad (1)$$

where $\tau_p$ is the delay of the local sequence $cr_0(n)$ (i.e., of the prompt correlator P) with respect to a local time reference, synchronous with the clock 44 of the receiver, whilst $\tau_{A1}$ and $\tau_{A2}$ are, respectively, the delays of the first and second additional signals A1(n) A2(n) with respect to the aforesaid time reference. The amounts $s_{A1}$ and $s_{A2}$ are expressed in fractions of chip; in what follows, these amounts are understood as being expressed in fractions of chip, except where otherwise specified.

Each of the quadrature part 64 of the first additional correlator 51 and the quadrature part 66 of the second additional correlator 53 comprises a respective correlation multiplier 58b and a respective accumulator 60b connected together. The outputs of the accumulators 60b of the quadrature parts of the first and second additional correlators 51, 53 are connected at input to the processing unit 52, instead of to the discriminator 30.

The correlation multiplier 58b of the quadrature part 64 of the first additional correlator 51 has a first input and a second input, the first input being connected to the output of the second subchannel filter 23b so as to receive the quadrature signal Q(n), the second input being connected to the local waveform generator 34 so as to receive the first additional signal A1(n).

The correlation multiplier 58b of the quadrature part 66 of the second additional correlator 53 has a first input and a second input, the first input being connected to the output of the second subchannel filter 23b so as to receive the quadrature signal Q(n), the second input being connected to the local waveform generator 34 so as to receive the second additional signal A2(n).

Figure 4A:
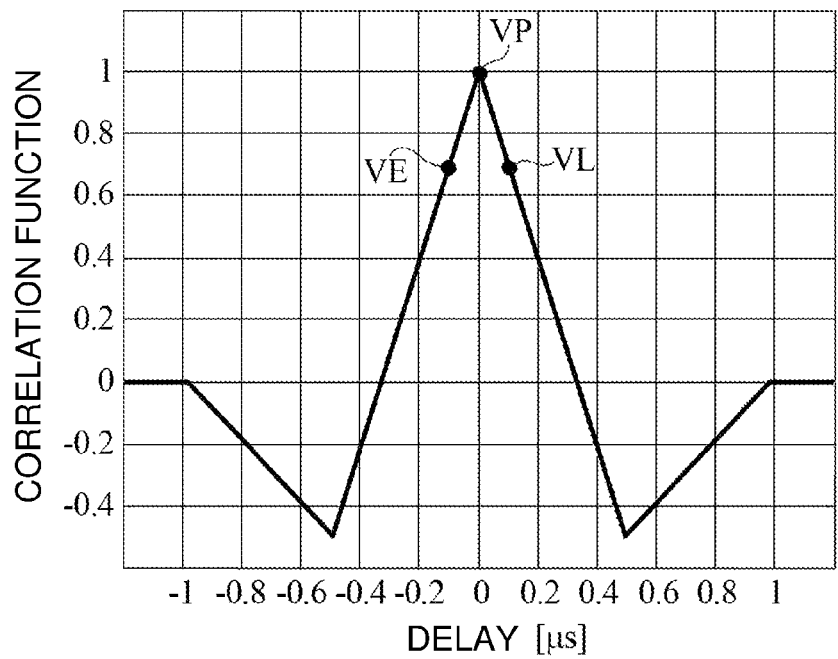
FIGS. 4a-4b and 15 show examples of correlation functions.
Figure 4B:
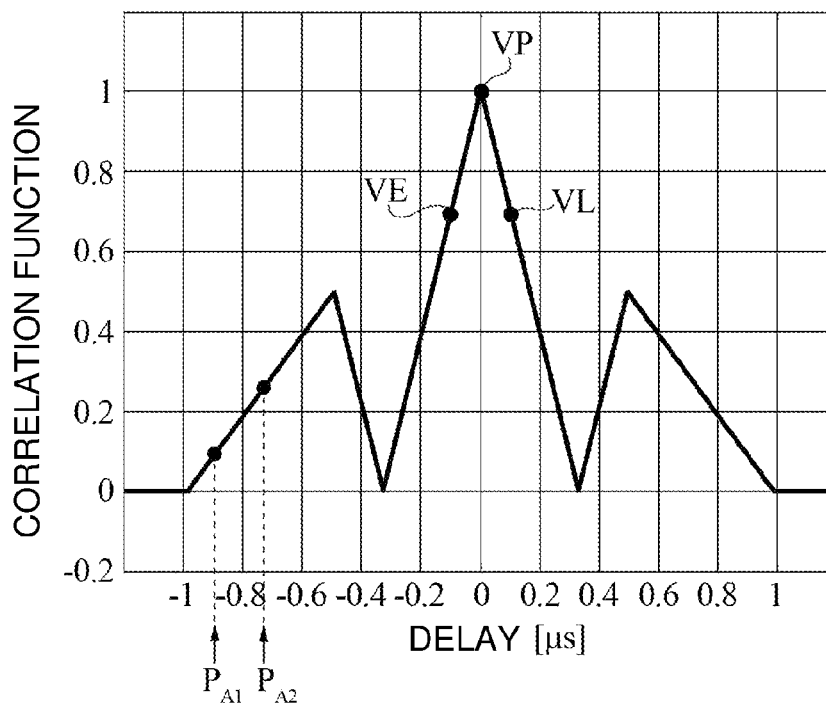
Figure 5:
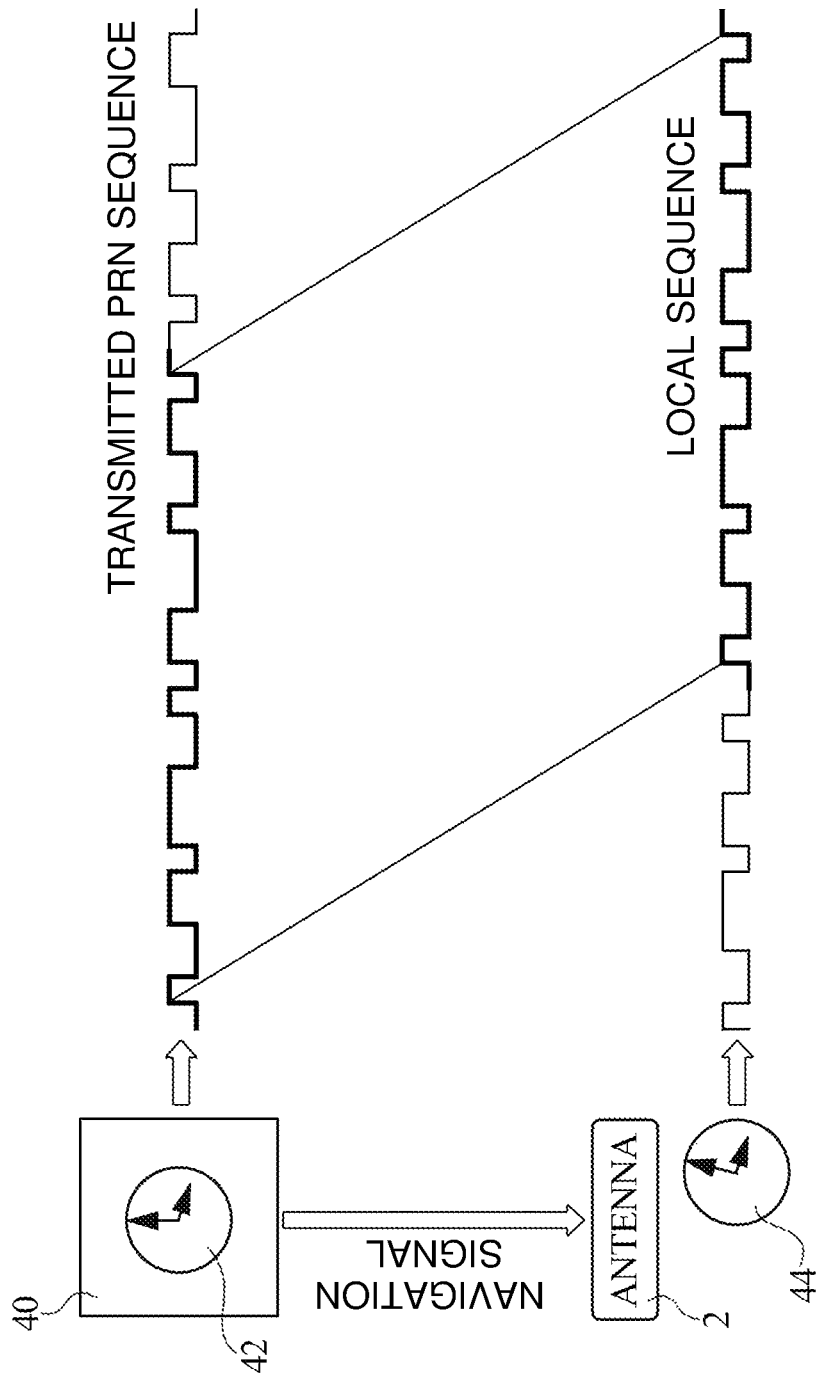
FIG. 5 shows a qualitative diagram that illustrates the mechanisms of generation of a local PRN sequence, as a function of a PRN sequence transmitted.
Figure 6:
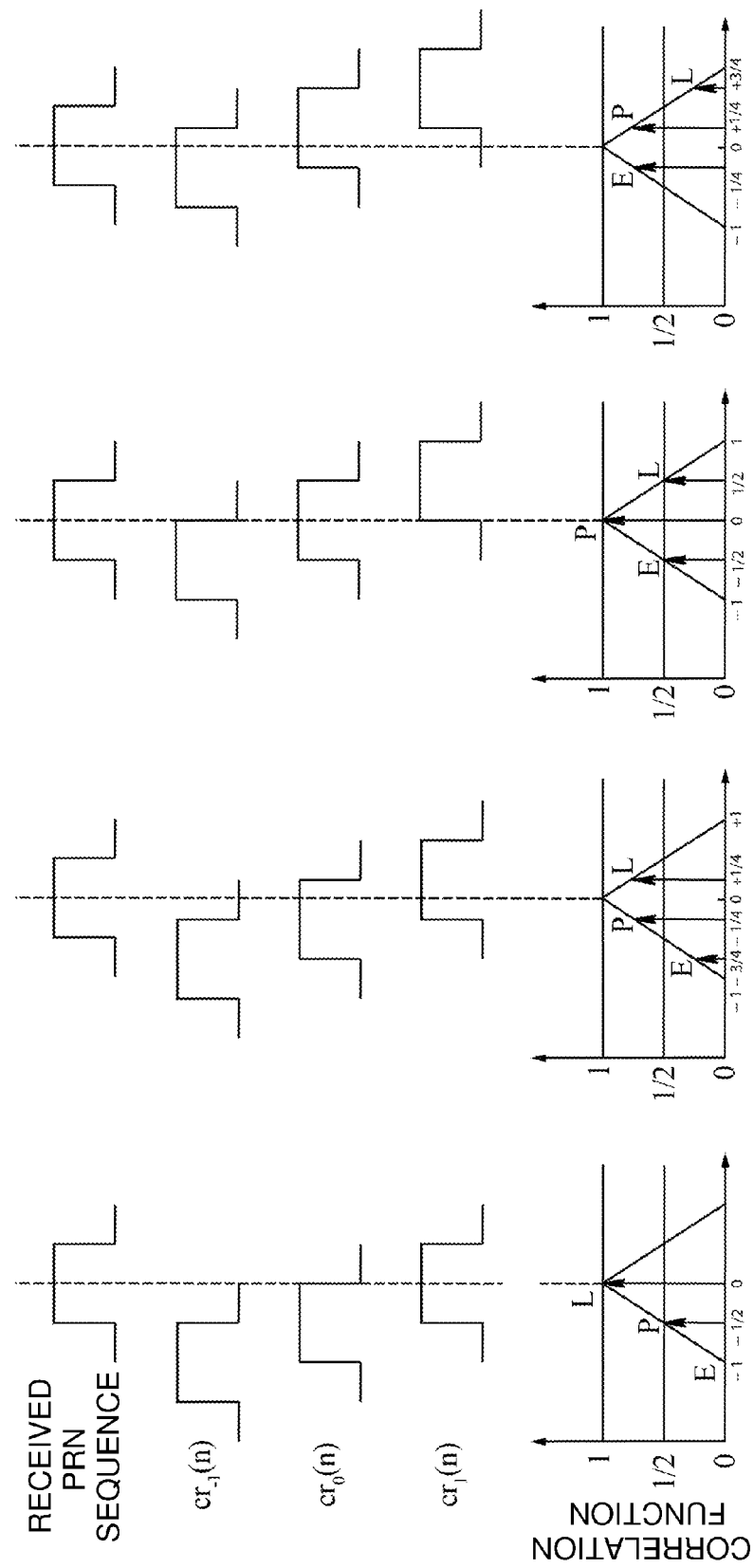

In practice, the in-phase parts of the first and second additional correlators 51, 53 operate on the in-phase component of the sampled input signal $s_i(n)$, whereas the quadrature parts of the first and second additional correlators 51, 53 operate on the quadrature component of the sampled input signal $s_i(n)$. Furthermore, the outputs of the in-phase and quadrature parts of the first and second additional correlators 51, 53 are not used by the discriminator 30 and hence do not affect operation of the local waveform generator 34, and in particular do not affect control of the delay $\tau_p$ of the local sequence by the delay-locked loop, i.e., the position of the prompt correlator P. In this connection, in what follows the term "position of a correlator" will be used to indicate the delay of the local sequence/replica of the local sequence present on the second input of the correlation multipliers of said correlator. An example of the positioning of the first and second additional correlators 51, 53 is represented in FIG. 4b, where the positions of the two additional correlators are designated by $P_{A1}$ and $P_{A2}$.

For practical purposes, it is likely that the plot of the correlation function for the first and second additional correlators 51, 53 will not be distorted by any multipath. Furthermore, the positions of the first and second additional correlators 51, 53, and hence the corresponding spacings, are fixed with respect to the positions of the prompt correlator P, the early correlator E, and the late correlator L. In other words, in the mode of mitigation of the multipath effects, the aforementioned amounts $s_{A1}$ and $s_{A2}$ are fixed in time; hence the positions of the first and second additional correlators 51, 53 vary in time fixedly with the positions of the prompt correlator P, early correlator E, and late correlator L.

An error of time alignment of the local sequence with respect to the PRN sequence received along the line-of-sight path, caused by the presence of multipaths, induces a rigid translation in time of the positions of the prompt correlator P, early correlator E, and late correlator L, as well as of the first and second additional correlators 51, 53, and hence leads to the correlation measurements at output from the additional correlators 51, 53 being shifted proportionally along the correlation function. In particular, since the first and second additional correlators 51, 53 are arranged in a linear area of the correlation function, the deviation with respect to the case in the absence of multipaths is proportional to the alignment error caused by the multipaths on the prompt correlator P; consequently, by knowing beforehand the form of the correlation function in the absence of multipaths, it is possible to estimate, and thus compensate, the alignment error caused by the presence of multipaths.

In greater detail, in what follows the term "in-phase part of the first additional correlation signal $s_{d\_A1\_I}(w)$" is used to indicate the samples at output from the accumulator 60a of the in-phase part 54 of the first additional correlator 51, and the term "quadrature part of the first additional correlation signal $s_{d\_A1\_Q}(w)$" is used to indicate the samples at output from the accumulator 60b of the quadrature part 64 of the first additional correlator 51. Furthermore, the term "in-phase part of the second additional correlation signal $s_{d\_A2\_I}(w)$" is used to indicate the samples at output from the accumulator 60a of the in-phase part 56 of the second additional correlator 53, and the term "quadrature part of the second additional correlation signal $s_{d\_A2\_Q}(w)$" is used to indicate the samples at output from the accumulator 60b of the quadrature part 66 of the second additional correlator 53. Furthermore, the terms "modulus of the first additional correlation signal $y_1(w)$" and "modulus of the second additional correlation signal $y_2(w)$" are used to indicate two signals calculated by the processing unit 52 and given, respectively, by:

$$y_1(w)=[(s_{d\_A1\_I}(w))^2+(s_{d\_A1\_Q}(w))^2]^{1/2}$$

$$y_2(w)=[s_{d\_A2\_I}(w))^2+s_{d\_A2\_Q}(w))^2]^{1/2} \qquad (2)$$

As illustrated in FIG. 8a, in the absence of multipaths, the first and second additional correlators 51, 53 are positioned, respectively, in $x_1^0$ and $x_2^0$, with $x_1^0=1-s_{A1}$ and $x_2^0=1-s_{A2}$, and are such that the moduli of the first and second additional correlation signals are, respectively, equal to $y_1^0$ and $y_2^0$; i.e., they are respectively equal to the values of the correlation function of the first sequence PRN1 in the absence of multipaths, calculated, respectively, at a distance equal to $s_{A1}$ and $s_{A2}$ from the main peak of said correlation function. In what follows, for brevity, the term "reference correlation function" is used to indicate the correlation function of the first sequence PRN1, as received by the receiver 1 along the line-of-sight path and in the absence of multipaths; said function can be determined in a way in itself known during a calibration step, which is characterized not only by the absence of multipaths but also by the presence, preferably, of a negligible noise. In theory, in the absence of non-idealities of the input stage 4, the reference correlation function has the same form as the so-called function of autocorrelation of the first sequence PRN1. The reference correlation function hence has a predetermined profile; moreover, the reference correlation function may be stored, for example within a memory of the processing unit 52. The difference of position between the first and second additional correlators 51, 53 is given by $$d=x_2^0-x_1^0=s_{A1}-s_{A2} \qquad (3)$$

As illustrated in FIG. 8b, in the presence of an alignment error τ due to the presence of multipaths, the positions of the first and second additional correlators 51, 53 become equal to $x_1^1$ and $x_2^1$, with $x_1^1=x_1^0+\tau$ and $x_2^1=x_2^0+\tau=x_1^0+d+\tau$; moreover, the moduli of the first and second additional correlation signals are respectively equal to $y_1^1$ and $y_2^1$. The following relation thus applies $$x_1^1+x_2^1=x_1^0+x_2^0+2\tau=2x_1^0+d+2\tau \qquad (4)$$

Since the (nonzero) slope m of the correlation function does not change, given that it may be assumed that the portion of the correlation function comprised between $x_1^0$ and $x_2^1$ is not distorted by multipaths, we have $$m=(y_2^0-y_1^0)/(x_2^0-x_1^0)=(y_2^1-y_1^1)/(x_2^1-x_1^1) \qquad (5)$$

The following relation thus applies:

$$m=(y_2^0-y_1^0)/d=(y_2^1-y_1^1)/d \qquad (6)$$

If we assume adopting a reference system having its origin in the delay equal to $-T_{chip}$ with respect to the maximum of the reference correlation function, and we represent locally, i.e., in the region of the first and second additional correlators 51, 53, the correlation function as a straight line passing through the points $(x_2^1, y_1^1)$ and $(x_2^1, y_2^1)$, the following relations apply:

$$y_1^1 = mx_1^1$$

$$y_2^1 = mx_2^1 \quad (7)$$

which, added together, yield $$y_1^1 + y_2^1 = m(x_1^1 + x_2^1) \quad (8)$$

We thus obtain the relation)

$$y_1^1 + y_2^1 = (y_2^1 - y_1^1)*(2x_1^0 + d + 2\tau)/d \quad (9)$$

which can be solved for i, as follows:

$$\tau = dy_1^1/(y_2^1 - y_1^1) - x_1^0 \quad (10)$$

Equivalently, we have $$\tau = (dy_1^1 + x_1^0 y_1^1 - x_1^0 y_2^1)/(y_2^1 - y_1^1) \quad (11)$$

In the particular case where $x_1^0 = d$ and $x_2^0 = 2d$, the expression of i is simplifies as follows $$\tau = dy_1^1/(y_2^1 - y_1^1) - d = d*(2y_1^1 - y_2^1)/(y_2^1 - y_1^1) \quad (12)$$

The foregoing considerations apply also in the case where T is negative given that the portion of the correlation function comprised between $x_1^1$ and $x_2^0$ is not distorted by the multipaths.

On the basis of the foregoing equations, the processing unit 52 calculates $\tau$, i.e., it calculates an estimate of the alignment error of the local sequence with respect to the PRN sequence received along the line-of-sight path. Furthermore, on the basis of $\tau$, the processing unit 52 corrects the pseudo-range value. This correction is obtained in open-loop mode, i.e., without affecting the discriminator 30, nor in general the DLL. For instance, the correction of the pseudo-range may be made at the same frequency with which the pseudo-range is calculated, i.e., with a frequency lower than the operating frequency of the first and second additional correlators 51, 53.

In practice, since the points $(x_1^0, y_1^0)$, $(x_2^0, y_2^0)$, $(x_1^1, y_1^1)$ and $(x_2^1, y_2^1)$ define a linear relation, the processing unit 52 determines an estimate of alignment error on the basis of said relation. In fact, the points $(x_1^1, y_1^1)$ and $(x_2^1, y_2^1)$ are translated by one and the same amount with respect to the point $(x_1^0, y_1^0)$ and the point $(x_2^0, y_2^0)$, respectively, along the correlation function, said amount being proportional to the alignment error; moreover, the portion of correlation function comprised between the points $(x_1^0, y_1^0)$ and $(x_2^1, y_2^1)$ is linear, for the reasons explained previously.

Even more in particular, $\tau$ is calculated as a function of the positions of the points $(x_1^1(w), y_1^1(w))$ and $(x_2^1(w), y_2^1(w))$, where the reference correlation function assumes values equal to the values of the moduli of the first and second additional correlation signals $y_1^1$ and $y_2^1$, respectively, with respect to at least one reference point (in the example described, the point $(x_1^0, y_1^0)$, without this implying any loss of generality) of the reference correlation function, which is separated from the main peak of the reference correlation function by a distance equal to the time shift present between the first additional signal $A1(n)$ and the local sequence $cr_0(n)$.

Since, on account of the lower amplitude of the correlation function, the outputs of the first and second additional correlators 51, 53 have a low signal-to-noise ratio, advantageously the processing unit 52 can calculate the estimate $\tau$ as a function of $y_{m1}(w)$ and $y_{m2}(w)$, instead of $y_1^1(w)$ and $y_2^1(w)$, respectively.

In detail, the processing unit 52 may implement, as illustrated in FIG. 9, a first processing filter 102, a second processing filter 104, a third processing filter 106, and a fourth processing filter 108, which receive at input, respectively, the in-phase part of the first additional correlation signal $s_{d\_A1\_I}(w)$, the quadrature part of the first additional correlation signal $s_{d\_A1\_Q}(w)$, the in-phase part of the second additional correlation signal $s_{d\_A2\_I}(w)$, and the quadrature part of the second additional correlation signal $s_{d\_A2\_Q}(w)$. At output, the first, second, third, and fourth processing filters 102-108 supply, respectively, a filtered in-phase part of the first additional correlation signal $s_{M\_A1\_I}(w)$, a filtered quadrature part of the first additional correlation signal $s_{M\_A1\_Q}(w)$, a filtered in-phase part of the second additional correlation signal $s_{M\_A2\_I}(w)$, and a filtered quadrature part of the second additional correlation signal $s_{M\_A2\_Q}(w)$.

The processing unit 52 moreover implements a first modulus-extraction block 110 and a second modulus-extraction block 112. The first modulus-extraction block 110 receives at input the filtered in-phase part of the first additional correlation signal $s_{M\_A1\_I}(w)$ and the filtered quadrature part of the first additional correlation signal $s_{M\_A1\_Q}(w)$, and supplies the samples $y_{m1}(w)$, which are referred to, as a whole, as "filtered modulus of the first additional correlation signal". In particular, we have $$y_{m1}(w) = [(s_{M\_A1\_I}(w))^2 + (s_{M\_A1\_Q}(w))^2]^{1/2} \quad (13)$$

Likewise, the second modulus-extraction block 112 receives at input the filtered in-phase part of the second additional correlation signal $s_{M\_A2\_I}(w)$ and the filtered quadrature part of the second additional correlation signal $s_{M\_A2\_Q}(w)$, and yields the samples $y_{m2}(w)$, which are referred to, as a whole, as "filtered modulus of the second additional correlation signal". In particular, we have $$y_{m2}(w) = [(s_{M\_A2\_I}(w))^2 + (s_{M\_A2\_Q}(w))^2]^{1/2} \quad (14)$$

In greater detail, the first, second, third, and fourth processing filters 102-108 may each implement a filtering of a lowpass type on the input values, for example by implementing a moving-average operator, having a window equal to a number $N_{coh}$ of samples, with $N_{coh}$, for instance, equal to $(A_P/A_{c1})^2$, where $A_P$ is the maximum amplitude of the reference correlation function, and $A_{c1}$ is the amplitude of the reference correlation function at a time distance equal to $s_{A1}$ from the maximum of the correlation function.

Alternatively, the first, second, third, and fourth processing filters 102-108 may each be formed, for example, by a stage designed to calculate an infinite-memory exponential average, also known as "Hatch filter". In this case, the processing unit 52 stores just one value at each step; more in particular, the Hatch filter may be implemented by means of a first-order IIR (infinite impulse response) numeric filter.

Advantageously, the first, second, third, and fourth processing filters 102-108 may each be formed by a second-order IIR Butterworth filter, which has a fast step response and uses only two storage elements.

Irrespective of the previous details of implementation, the processing unit 52 implements coherent additions of the samples supplied by the first and the second additional correlators 51, 53 in order to increase the signal-to-noise ratio present on the outputs of the latter. However, possible are embodiments in which the additions are of a non-coherent type, as illustrated by way of example in FIG. 10.

According to the embodiment illustrated in FIG. 10, the first modulus-extraction block 110 receives at input the in-phase part of the first additional correlation signal $s_{d\_A1\_I}(w)$ and the quadrature part of the first additional correlation signal $s_{d\_A1\_Q}(w)$. The second modulus-extraction block 112 receives at input the in-phase part of the second additional correlation signal $s_{d\_A2\_I}(w)$ and the quadrature part of the second additional correlation signal $s_{d\_A2\_Q}(w)$. In practice, the first and second modulus-extraction blocks 110, 112 implement the above Eqs. (2). Furthermore, the first and second processing filters 102, 104 receive at input, respectively, the samples supplied by the first and second modulus-extraction blocks 110, 112. Each of the first and second processing filters 102, 104 may be formed, for example, by a moving-average filter, a Hatch filter, or else a second-order IIR Butterworth filter.

According to the embodiment illustrated in FIG. 10, first the modulus of the first additional correlation signal $y_1(w)$ and the modulus of the second additional correlation signal $y_2(w)$ are calculated, and then the samples of the filtered modulus of the first additional correlation signal $y_{m1}(w)$ and the samples of the filtered modulus of the second additional correlation signal $y_{m2}(w)$ are obtained by filtering the moduli of the first and second additional correlation signals $y_1(w)$, $y_2(w)$.

Since it is possible, even in the absence of multipaths, for the input stage 4 to introduce distortions on the signal received and hence on the correlation function, it is moreover possible for the processing unit 52 to implement a mechanism of compensation of the distortions introduced by the input stage 4.

In detail, it is possible to carry out a calibration procedure, as illustrated in FIG. 11. The calibration procedure is carried out off-line, i.e., in the absence of multipaths and, possibly, also in the absence of noise, or in any case with a high value of signal-to-noise ratio, as well as using a signal modulated as the navigation signals that are expected to be received in use.

Initially, the processing unit 52, the connections of which with the local waveform generator 34 are not illustrated, varies (block 120) the positions of the first and second additional correlators 51, 53 with discrete steps $\theta_j$, around the respective positions $x_1^0$ and $x_2^0$, keeping the distance d between them constant. In particular, the positions of the first and second additional correlators 51, 53 are varied so as to be equal to $x_1^0 + \theta_j$ and $x_2^0 + \theta_j$, where j is an integer equal to $-j_{max}$, $-j_{max}+1$, . . . , $j_{max}-1$, $j_{max}$. The values of the deviations $\theta_j$ are, for example, negative for $j = -j_{max}, \ldots, -1$ and positive for $j = 1, \ldots, j_{max}$.

For each value of j, the processing unit 52 determines (block 122) the moduli of the first and second additional correlation signals, here designated by $y_{t1}(\theta_j)$ and $y_{t2}(\theta_j)$.

Next, for each value of j, the processing unit 52 calculates (block 124) a corresponding calibration value $\tau_{cal}$, on the basis of Eq. (11), where the values $y_{t1}(\theta_j)$ and $y_{t2}(\theta_j)$ are substituted for the values $y_1^1$ and $y_2^1$.

As illustrated in FIG. 12, the processing unit 52 hence possesses a calibration curve $\tau_{cal}(\theta_j)$ which correlates the values $\theta_j$ with the corresponding calibration values $\tau_{cal}(\theta_j)$. In the absence of non-idealities of the input stage 4, the calibration curve $\tau_{cal}(\theta_j)$ is a straight line, because the deviations $\theta_j$ represent deviations with respect to the positions $x_1^0$, $x_2^0$.

Subsequently, when operating in normal conditions, i.e., not in calibration mode, the processing unit 52 uses the calibration curve $\tau_{cal}(\theta_j)$ for improving the accuracy of the estimate of the alignment error $\tau$. In particular, given a value of the alignment error $\tau$ obtained by applying Eqs. (11) or (12) (the operations that have led to the determination of $\tau$ are designated by 126 in FIG. 11), the processing unit 52 determines (block 128) a corresponding corrected value $\tau_{acc}$, which is equal to the deviation value $\theta_j$ such that the calibration curve $\tau_{cal}(\theta_j)$ assumes, precisely, the value $\tau$.

In order to implement the operations of block 128, the processing unit 52 may, for example, determine, on the basis of the calibration curve $\tau_{cal}(\theta_j)$ a correction function $e(\tau)$ equal to $\theta_j - \tau_{cal}(\theta_j)$, in such a way that the relation $\tau_{acc} = \tau + e(\tau)$ applies. In turn, the correction function $e(\tau)$ may be stored by points, by using a so-called "look-up table". Alternatively, the processing unit 52 may store the coefficients of a interpolating polynomial, which interpolates the values of the correction function $e(\tau)$ previously determined so as to limit the amount of memory used to calculate the corrected value $\tau_{acc}$.

Moreover possible are embodiments in which the processing unit 52 stores an estimate of the maximum value of alignment error, obtained, for example, in a known way on the basis of the so-called multipath-error-envelope curves. In this case, the processing unit 52 determines a window of acceptable values for estimating the alignment error $\tau$; values of $\tau$ falling outside this window are not considered acceptable and hence are not used for correcting the pseudo-range.

According to a different embodiment, the receiver 50 may implement, in addition to the aforementioned operations that enable mitigation of the multipath effects, a technique that prevents locking on a secondary peak of the correlation function; i.e., it prevents the position of the prompt correlator P from being aligned to a secondary peak of the correlation function calculated by the discriminator 30, instead of to the main peak. This technique is described in what follows with reference, purely by way of example, to the case where the navigation signal is modulated with a binary-offset-carrier modulation of a BOC(1,1) type, and no multipaths are present.

With reference to FIG. 13, the receiver 50 executes (block 200) operations of initialization, which envisage, in a way in itself known, a frequency locking and a rough code locking, as well as acquisition, by the processing unit 52, of parameters for the format of modulation (in the present example, the parameters for the BOC(1,1) modulation) of the navigation signals that will be received, in use, by the receiver 50.

Next, the processing unit 52 sets (block 202) the positions of the first and second additional correlators 51, 53 in a mode for preventing false locking. In particular, in this mode, the positions of the first and second additional correlators 51, 53 are respectively equal to $x_1^{sp} = 1 - s_{A1}^{sp}$ and $x_2^{sp} = 1 - s_{A2}^{sp}$, with $s_{A2}^{sp}$ having its sign opposite to $s_{A1}^{sp}$. In practice, in this false-locking prevention mode, the first and second additional correlators 51, 53 are arranged on opposite sides with respect to the prompt correlator P. Furthermore, in this mode, the amounts $s_{A2}^{sp}$ and $-s_{A1}^{sp}$ are fixed in time, and the first and second additional correlators 51, 53 still operate in open-loop mode.

In particular, since we have assumed that the navigation signal is modulated with a BOC(1,1) modulation, we have $s_{A2}^{sp} = -s_{A1}^{sp}$, and moreover we preferably have that $|s_{A1}^{sp}| < |s_{A1}|$ and $|s_{A2}^{sp}| < |s_{A2}|$, in such a way that the additional correlators 51, 53 work in a region of the correlation function with a higher signal-to-noise ratio. Furthermore, $s_{A1}^{sp}$ is such that the first additional correlator 51 is separated from the prompt correlator P by the same distance present between the main peak of the reference correlation function and the secondary peak of the same correlation function set to the left of the main peak. Likewise, $s_{A2}^{sp}$ is such that the second additional correlator 53 is separated from the prompt correlator P by the same distance present between the main peak of the reference correlation function and the secondary peak of the same correlation function set to the right of the main peak. It should be noted in any case that, with different modulation formats, characterized by a number of secondary peaks greater than two, each of the first and second additional correlators 51, 53 may be set, with respect to the prompt correlator P, at a distance different from the distance between one of the two secondary peaks adjacent to the main peak and the main peak itself. For example, in the case of $BOC_c(15,2.5)$ modulation, this distance may be equal to the distance between the main peak and a secondary peak having amplitude equal to one half of the amplitude of the main peak.

Next, the processing unit 52 determines (block 204), as previously explained with reference to FIG. 9 (coherent additions), the filtered moduli of the first and second additional correlation signals, which are designated here, respectively, by $y_{m1}^{sp}(w)$ and $y_{m2}^{sp}(w)$. Furthermore, in the false-locking prevention mode, the first, second, third, and fourth processing filters 102-108 may be formed by corresponding adders (i.e., coherent accumulators), even though in any case possible are embodiments in which also in the false-locking prevention mode the first, second, third, and fourth processing filters 102-108 are each formed, for example, by a moving-average filter, or by a Hatch filter or by an second-order IIR Butterworth filter.

Furthermore, if by "in-phase part of the prompt-correlation signal $s_{dI,0}(w)$" we denote the samples at output from the accumulator 28a of the in-phase part 24a of the prompt correlator P, and by "quadrature part of the prompt-correlation signal $s_{dQ,0}(w)$" we denote the samples at output from the accumulator 28b of the quadrature part 24b of the prompt correlator P, the processing unit 52 determines a filtered modulus of the prompt-correlation signal $y_{mP}^{sp}(w)$ as a function of the in-phase part of the prompt-correlation signal $s_{dI,0}(w)$ and of the quadrature part of the prompt-correlation signal $s_{dQ,0}(w)$. For this purpose, even though it is not illustrated, the processing unit 52 is also connected to the accumulators of the prompt correlator P.

As illustrated in FIG. 14, in order to determine the filtered modulus of the prompt-correlation signal $y_{mP}^{sp}(w)$, the processing unit 52 may, for example, implement a fifth processing filter 114 and a sixth processing filter 116, which receive at input, respectively, the in-phase part of the prompt-correlation signal $s_{dI,0}(w)$ and the quadrature part of the prompt-correlation signal $s_{dQ,0}(w)$ and generate at output, respectively, a filtered in-phase part of the prompt-correlation signal $s_{M\_P\_I}(w)$ and a filtered quadrature part of the prompt-correlation signal $s_{M\_P\_Q}(w)$. Furthermore, the processing unit 52 implements a third modulus-extraction block 118, which receives at input the filtered in-phase part of the prompt-correlation signal $s_{M\_P\_I}(w)$ and the filtered quadrature part of the prompt-correlation signal $s_{M\_P\_Q}(w)$ and generates the filtered modulus of the prompt-correlation signal $y_{mP}^{sp}(w)$. Each of the fifth and sixth processing filters 114, 116 may be formed, for example, by an adder, or else by a moving-average filter, or else by a Hatch filter, or else by a second-order IIR Butterworth filter. In practice, the block diagram illustrated in FIG. 14 implements a coherent sum, which enables limitation of the effects of noise.

Once again, with reference to FIG. 13, the processing unit 52 calculates (block 206) the value of a parameter U, which is given by $$U=[y_{m2}^{sp}(w)-y_{m1}^{sp}(w)]/y_{mP}^{SP}(w) \quad (15)$$

Figure 15:
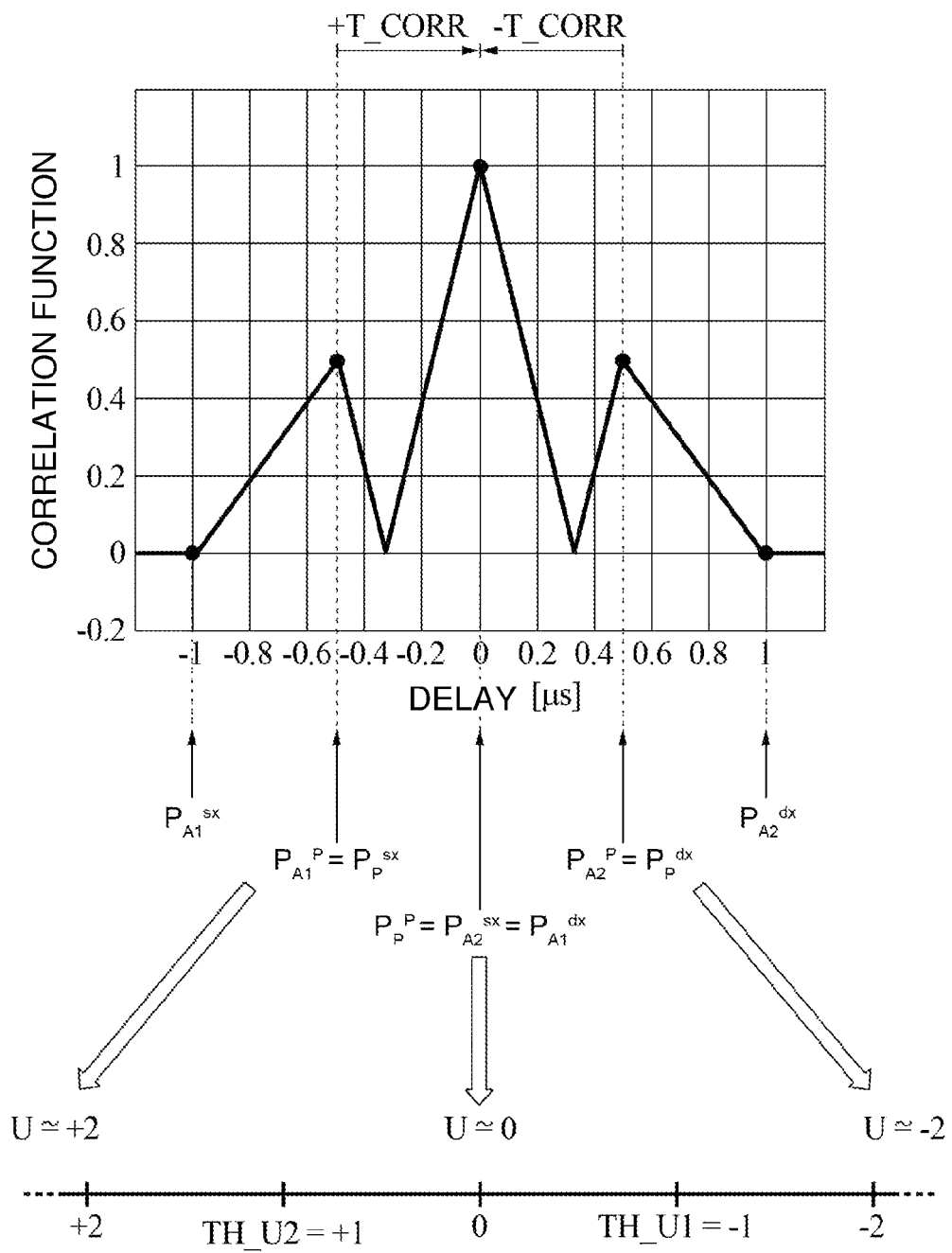

As illustrated qualitatively in FIG. 15, the parameter U assumes zero (or almost zero) values in the case of correct locking on the main peak; otherwise, it assumes negative or positive values, in a false-locking condition, enabling discrimination between early or late alignment errors.

In particular, the positions of the prompt correlator P and of the first and second additional correlators 51, 53 are designated, respectively, in the case of locking on the main peak, by $P_P^P$, $P_{A1}^P$, $P_{A2}^P$. The positions of these correlators are likewise designated, respectively, by $P_P^{sx}$, $P_{A1}^{sx}$, $P_{A2}^{sx}$, in the case of locking on the secondary peak to the left of the main peak, and by $P_P^{dx}$, $P_{A1}^{dx}$, $P_{A2}^{dx}$, in the case of locking on the secondary peak to the right of the main peak. In addition, in the case of locking on the main peak, U is approximately equal to 0, whereas U is approximately equal to −2 in the case of locking on the secondary peak to the right of the main peak, and U is approximately equal to +2, in the case of locking on the secondary peak to the left of the main peak.

It should moreover be noted that the discriminator 30 and the carrier generator 20 operate, in a way in itself known, so that there cannot occur, except in a transient condition, a situation in which the prompt correlator P is not locked to any peak of the correlation function determined by the discriminator 30. In other words, in steady-state conditions, the prompt correlator P is locked to a peak, whether it be the main peak or a secondary peak of the reference correlation function, in the case of absence of multipaths, or else, in the case of presence of multipaths, a peak of the correlation function of the combination of the sequences received through the paths that reach the receiver 50.

Following upon the operations of 206, the processing unit 52 compares the parameter U with a first threshold TH_U1 and a second threshold TH_U2 for example equal to −1 and +1, respectively.

For instance, the first and second thresholds TH_U1, TH_U2 may be calculated on the basis of a reference parameter U*, which is equal, for each point of the reference correlation function considered, to (TEO2−TEO1)/TEO0, where TEO0, TEO1, and TEO2 are, respectively, the values of the reference correlation function in the point considered and in the two points set, respectively, on the left and on the right of the point considered and separated therefrom by the same distance (in modulus) that exists between the main peak and any one of the two secondary peaks of the correlation function. In other words, the reference parameter U* represents, in the absence of multipaths, an analogue of the parameter U. This said, the first threshold TH_U1 is equal to one half of the difference between the values assumed by the reference parameter U* when calculated in the secondary peak on the right and in the main peak of the correlation function. Moreover, the second threshold TH_U2 is equal to one half of the difference between the values assumed by the reference parameter U* when calculated in the secondary peak on the left and in the main peak.

Irrespective of the details regarding determination of the first and second thresholds TH_U1 and TH_U2, the processing unit 52 verifies (block 208) whether the parameter U is comprised between the first and second thresholds TH_U1, TH_U2.

In the case where the parameter U falls outside the interval [TH_U1−TH_U2] (output NO from block 208), this means that a secondary peak has been locked. In particular, if the sign of the parameter U is positive, this means that the secondary peak to the left of the main peak has been locked. If the sign of the parameter U is negative, this means that the secondary peak to the right of the main peak has been locked. Consequently, the processing unit 52 modifies (block 210) the positions of the prompt correlator P, the early correlator E, and the late correlator L, as well as the positions of the first and second additional correlators 51, 53, modifying the delays of the respective replicas of the local sequence by one and the same amount (with sign), equal to the time distance present between the main peak of the reference correlation function and the secondary peak that has been locked. The latter spacing is known beforehand and is stored, for example, within a "look-up table". In this way, the correlators are brought closer to the main peak of the correlation function determined by the discriminator 30.

In practice, both in the presence and in the absence of multipaths, if the parameter U falls in the interval [TH_U2, +infinity[, the positions of the prompt correlator P, early correlator E, and late correlator L and the positions of the first and second additional correlators 51, 53 are delayed by a time +T_CORR, equal to the difference between the position of the main peak and the position of the secondary peak on the left. Instead, if the parameter U falls in the interval]−infinity, TH_U1], the positions of prompt correlator P, early correlator E, and late correlator L and the positions of the first and second additional correlators 51, 53 are in advance by a time −T_CORR, equal to the difference between the position of the main peak and the position of the secondary peak on the right.

Next, the processing unit 52 iterates the operations of blocks 204-208.

In the case where the parameter U is, instead, comprised within the interval [TH_U1, TH_U2] (output YES from block 208), this means that the main peak has been locked properly. Consequently, the processing unit 52 can start to carry out the operations of multipath mitigation. Consequently, the processing unit 52 modifies (block 214) the positions of the first and second additional correlators 51, 53 so as to bring them, respectively, into the aforementioned positions $x_1^0=1-s_{A1}$ and $x_2^0=1-s_{A2}$. In other words, the processing unit 52 switches its operating mode and enters the mode of mitigation of the multipath effects, the operations of which are designated as a whole by 216 in FIG. 13.

The processing unit 52 may, for example, remain in the mode of mitigation of the multipath effects for a predetermined period of time, after which, i.e., once this period has elapsed, it performs again the operations of block 202.

It should be noted that, in the case where the navigation signal is modulated with a modulation format such that the reference correlation function has a number Num_S>2 of secondary peaks, the number of thresholds for the parameter U may be equal, for example, to Num_S in such a way that a number Num_S+1 of intervals is defined, of which two are open. Furthermore, the thresholds may be set as a function of the values assumed by the reference parameter U* at the peaks of the reference correlation function and on the hypothesis that the points to which there correspond, each time, the values TEO1 and TEO2 are separated from one another by twice the inter-peak distance, i.e., the distance that separates two adjacent peaks. In greater detail, the thresholds may be set in such a way that there is correspondence between each interval and each peak. In particular, the thresholds, and hence the intervals, may be set in such a way that, if the parameter U falls within the central interval, i.e., the interval that includes zero, it means that the main peak has been locked. Otherwise, if the parameter U falls in the r-th interval, it means that the secondary peak that corresponds to said r-th interval has been locked. In this way, it is possible to correct the misalignment. Furthermore, the values of the thresholds may be set also as a function of possible distortions introduced by components of the receiver 50 on the navigation signal, which may lead to variations of the positions and of the amplitudes of the peaks.

According to other examples of the present receiver 50 (not claimed), the operations of blocks 200-210 are performed even without the operations of blocks 214-216 then being carried out. In other words, in these examples, the processing unit 52 operates only in the false-locking prevention mode.

According to a further embodiment, the processing unit 52 disables determination of the delay τ in the case where the carrier-to-noise ratio $C/N_0$ of the analog input signal $s_i(t)$ is lower than a threshold equal, for example, to 40 dB/Hz. In this case, it is in fact possible for the estimate of the delay τ not to be precise.

The advantages that the present receiver affords emerge clearly from the foregoing description. In particular, the present receiver determines a correction value that can be used directly for compensating the component of error of estimation of the pseudo-range caused by the multipaths. Furthermore, the present receiver can operate in the presence of navigation signals modulated with multiple modulation formats, including, for example, signals with BOC(1,1), CBOC, TMBOC, AltBOC, $BOC_c(15,2.5)$, and $BOC_c(10,5)$ modulation.

In addition, the present receiver comprises a delay-locked loop of a traditional type. Consequently, the modifications introduced by the present receiver as compared to traditional receivers are not particularly burdensome from the computational standpoint.

Furthermore, the present receiver enables a substantially total correction of the error of alignment of the local sequence caused by the presence of multipaths with a delay with respect to the line-of-sight path longer than a threshold delay, which depends upon the position of the two additional correlators.

Finally, it is evident that modifications and variations may be made to the present receiver, without thereby departing from the scope of the present invention as defined by the annexed claims.

For instance, the filtered moduli of the first and second additional correlation signals $y_{m1}^{SP}(w)$ and $y_{m2}^{SP}(w)$ and the filtered modulus of the prompt-correlation signal $y_{mP}^{SP}(w)$ may be calculated on the basis of non-coherent additions, instead of coherent additions. Furthermore, as regards Eq. (15), it is possible for the denominator to be different from $y_{mP}^{SP}(w)$; for example, the denominator may be equal to one between $y_{m1}^{SP}(w)$ and $y_{m2}^{SP}(w)$, or else may be equal to an algebraic expression that is a function of two or three of $y_{m1}^{SP}(w)$, $y_{m2}^{SP}(w)$, and $y_{mP}^{SP}(w)$.

In addition, in the case where the navigation signal also includes transitions due to the presence of modulated data, or else to the presence of a so-called secondary code, the filtering operations described previously and illustrated in FIGS. 9, 10, and 14 may be implemented so as to consider also the current, i.e., instantaneous, sign of the data, using known techniques. In fact, it is possible to multiply by the current sign present on the output of the in-phase part of the prompt correlator P each signal between the in-phase part of the first additional correlation signal $s_{d\_A1\_I}(w)$, the quadrature part of the first additional correlation signal $s_{d\_A1\_Q}(w)$, the in-phase part of the second additional correlation signal $s_{d\_A2\_I}(w)$, the quadrature part of the second additional correlation signal $s_{d\_A2\_Q}(w)$, the in-phase part of the prompt-correlation signal $s_{dI,0}(w)$, and the quadrature part of the prompt-correlation signal $s_{dQ,0}(w)$. In turn, an estimate of the current sign is provided, in a way in itself known, by the sign of the ratio $s_{dI,0}(w)/|s_{dI,0}(w)|$. Furthermore, in this case the first, second, third, fourth, fifth, and sixth processing filters 102-116 operate on the signals obtained following upon the multiplication with the current sign. In this way, the processing is rendered independent of the current sign of the data.

Furthermore, the tracking stage 6 may comprise a delay-locked loop of a type different from the one described. For instance, the delay-locked loop may be formed by a number of correlators other than three. The function itself of discrimination of the discriminator 30 may be chosen arbitrarily from known discrimination functions. In general, moreover, the discriminator 30 may be of a coherent or non-coherent type. Furthermore, it is possible for the navigation signal to be modulated with a non-periodic PRN sequence, in which case also the local sequence and the corresponding replicas are non-periodic.

Within the receiver there may likewise be present additional decimators and/or accumulators, which enable variation of the frequencies at which the samples are generated in different portions of the receiver itself. Furthermore, the accumulators described may be of a different type; for example, the accumulators may not carry out the operation of division by K.

Furthermore, it is possible for each of the correlators of the delay-locked loop, as well as each of the first and second additional correlators, to be formed only by the respective in-phase part, i.e., not to have the corresponding quadrature part.

In addition, even though the tracking stage 6 has been described with reference to the case where it operates in base band, also possible are variants in which it operates in a translated band, i.e., around an appropriate intermediate frequency.

Finally, embodiments are possible that comprise a third additional correlator and a fourth additional correlator, arranged symmetrically with respect to the prompt correlator P and used for preventing locking on a secondary peak. In this case, the positions of the first and second additional correlators 51, 53 with respect to the prompt correlator P are not modified; in particular, the first and second additional correlators 51, 53 always operate in advance with respect to the prompt correlator P since they are used only for mitigating the multipath effects.

The invention claimed is:

1. An electronic receiver for a global navigation satellite system, configured to receive, along a line-of-sight path, a navigation signal ($s_i(t)$) modulated with a sequence of a pseudo-random type, and to receive, along reflected paths, a number of replicas of the navigation signal, said electronic receiver comprising:
    an input stage configured to generate an input signal ($s_i(n)$) of a numeric type, as a function of the navigation signal and of the replicas of the navigation signal;
    a delay-locked loop including a local waveform generator configured to generate a local sequence ($cr_0(n)$), said delay-locked loop being configured to receive the input signal and time align the local sequence to the sequence received along the line-of-sight path; and
    a first correlator and a second correlator, which are configured to receive the input signal and to generate, respectively, a first replica of the local sequence (A1($n$)) and a second replica of the local sequence (A2($n$)), said first and second correlators being moreover configured to generate, respectively, a first correlation signal ($y_1(w)$, $y_2(w)$) and a second correlation signal ($y_{m1}(w)$, $y_{m2}(w)$), the first correlation signal indicating the correlation between the combination of the sequences received and the first replica of the local sequence, the second correlation signal indicating the correlation between the combination of the sequences received and the second replica of the local sequence;
    wherein, in a first operating mode, the first and second correlators operate in open-loop mode and said first and second replicas of the local sequence are both in advance with respect to the local sequence, said receiver further comprising a processing unit configured to determine a first estimate of an alignment error ($\tau$) between the sequence received along the line-of-sight path and the local sequence, as a function of the first and second correlation signals and of the phase shifts between the local sequence and the first and second replicas of the local sequence; and wherein, in said first operating mode, the first replica of the local sequence (A1($n$)) is in advance with respect to the local sequence ($cr_0(n)$) by a first amount ($s_{A1}$), the second replica of the local sequence (A2($n$)) being in advance with respect to the local sequence by a second amount ($s_{A2}$), said first and second amounts being fixed; and wherein the processing unit is configured to determine a time indicating the positions of a first point (($x_1^1(w)$, $y_1^1(w)$)) and a second point (($x_2^1(w)$, $y_2^1(w)$)) of a reference correlation function, wherein said reference correlation function assumes values equal to the values of the first and second correlation signals ($y_1^1(w)$, $y_2^1(w)$; $y_{m1}(w)$, $y_{m2}(w)$), respectively with respect to a first reference point (($x_1^0(w)$, $y_1^0(w)$)) and a second reference point (($x_2^0(w)$, $y_2^0(w)$)) of said reference correlation function, said first and second reference points being separated from the main peak of said reference correlation function by distances proportional, respectively, to the first and second amounts; and wherein said reference correlation function indicates the correlation function in the absence of multipaths of the sequence received along the line-of-sight path.

2. The electronic receiver according to claim 1, wherein said reference correlation function has a predetermined profile between said first and second reference points (($x_1^0(w)$, $y_1^0(w)$), ($x_2^0(w)$, $y_2^0(w)$)).

3. The electronic receiver according to claim 1, wherein the first estimate of alignment error is proportional to the ratio:

$$(dy_1^1 + x_1^0 y_1^1 - x_1^0 y_2^1)/(y_2^1 - y_1^1)$$

where d is a function of the time shift between the first and second replicas of the local sequence (A1($n$), A2($n$)), and the values of the parameters $y_1^1$, $y_2^1$ and $x_1^0$ are a function, respectively, of the first correlation signal ($y_1(w)$; $y_{m1}(w)$), of the second correlation signal ($y_2(w)$; $y_{m2}(w)$), and of the time shift of the first replica of the local sequence with respect to the local sequence ($cr_0(n)$).

4. The electronic receiver according to claim 3, wherein the first and second replicas of the local sequence (A1($n$), A2($n$)) are time shifted with respect to the local sequence ($cr_0(n)$) by a delay equal to 1−d and by a delay equal to 1−2·d, respectively, with d equal to a fraction of a chip of the sequence received.

5. The electronic receiver according to claim 1, wherein the processing unit stores a calibration curve ($\tau_{cal}(\theta_j)$) indicating a part of the alignment error caused by the input stage (4), the processing unit being moreover configured to calculate a second estimate ($\tau_{acc}$) of the alignment error between the sequence received and the local sequence ($cr_0(n)$), on the basis of the first estimate of the alignment error ($\tau$) and of the calibration curve.

6. The electronic receiver according to claim 1, wherein the delay-locked loop comprises a third correlator (P), which is controlled in closed-loop mode and is configured to generate a third correlation signal ($y_{mP}^{sp}(w)$) indicating the correlation between the combination of the sequences received and the local sequence ($cr_0(n)$); and wherein, in a second operating mode, one between the first and second replicas of the local sequence ($A1(n)$, $A2(n)$) is in advance with respect to the local sequence ($cr_0(n)$) by a third amount, the other being delayed with respect to the local sequence by a fourth amount, the third amount being a function of the time distance between the main peak of the reference correlation function and a first secondary peak of said reference correlation function, the fourth amount being a function of the time distance between said main peak and a second secondary peak of said reference correlation function; and wherein the processing unit is moreover configured to:
  calculate a quantity (U) proportional to the ratio between a numerator equal to the difference between the second correlation signal and the first correlation signal and a denominator equal to one from among the first, second, and third correlation signals, or else to an algebraic function of two or more of the first, second, and third correlation signals;
  compare said quantity with at least one first threshold (TH_U1) and one second threshold (TH_U2), the first threshold being a function of the ratio between the difference between the two values of the reference correlation function that are separated from the first secondary peak by the same distance that is present between the main peak and the first secondary peak, and the value of the first secondary peak, the second threshold being a function of the ratio between the difference between the two values of the reference correlation function that are separated from the second secondary peak by the same distance that is present between the main peak and the second secondary peak, and the value of the second secondary peak; and
  modify the time shifts between the sequence received and, respectively, the local sequence and the first and second replicas of the local sequence ($A1(n)$, $A2(n)$) as a function of the mutual arrangement of said main peak and said first and second secondary peaks and of the arrangement of said quantity with respect to the interval ([TH_U1, TH_U2]) comprised between the first and second thresholds.

7. The electronic receiver according to claim 1, further comprising a component-extraction stage configured to extract an in-phase component ($I(n)$) and a quadrature component ($Q(n)$) of the input signal ($s_i(n)$); and wherein the first and second correlators are configured to receive the in-phase component and the quadrature component of the input signal; and wherein the first correlator is configured to generate an in-phase part ($s_{d\_A1\_I}(w)$) and a quadrature part ($s_{d\_A1\_Q}(w)$) of the first correlation signal, which indicate the correlation between the first replica of the local sequence ($A1(n)$) and, respectively, the in-phase component ($I(n)$) of the input signal and the quadrature component ($Q(n)$) of the input signal; and wherein the second correlator is configured to generate an in-phase part ($s_{d\_A2\_I}(w)$) and a quadrature part ($s_{d\_A2\_Q}(w)$) of the second correlation signal, which indicate the correlation between the second replica of the local sequence ($A2(n)$) and, respectively, the in-phase component of the input signal and the quadrature component of the input signal; and wherein the processing unit is configured to:
  generate a filtered in-phase part ($s_{M\_A1\_I}(w)$) and a filtered quadrature part ($s_{M\_A1\_Q}(w)$) of the first correlation signal by filtering, respectively, the in-phase part and the quadrature part of the first correlation signal;
  generate a filtered in-phase part ($s_{M\_A2\_I}(w)$) and a filtered quadrature part ($s_{M\_A2\_Q}(w)$) of the second correlation signal by filtering, respectively, the in-phase part and the quadrature part of the second correlation signal;
  calculate a filtered modulus of the first correlation signal ($y_{m1}$) proportional to the sum of the squares of the filtered in-phase part and of the filtered quadrature part of the first correlation signal;
  calculate a filtered modulus of the second correlation signal ($y_{m2}$) proportional to the sum of the squares of the filtered in-phase part and of the filtered quadrature part of the second correlation signal; and
  determine said first estimate of an alignment error ($\tau$) on the basis of the filtered moduli of the first and second correlation signals.

8. The electronic receiver according to claim 7, wherein, in a second operating mode, one of the first and second replicas of the local sequence ($A1(n)$, $A2(n)$) is in advance with respect to the local sequence ($cr_0(n)$) by a third amount, the other being delayed with respect to the local sequence by a fourth amount, the third amount being a function of the time distance between the main peak of the reference correlation function and a first secondary peak of said reference correlation function, the fourth amount being a function of the time distance between said main peak and a second secondary peak of said reference correlation function; and wherein the delay-locked loop comprises a third correlator (P), which is controlled in closed-loop mode (P) and is configured to generate an in-phase part of a third correlation signal ($s_{dI,0}(w)$), indicating the correlation between the in-phase component ($I(n)$) of the input signal and the local sequence, and a quadrature part of the third correlation signal ($s_{dQ,0}(w)$), indicating the correlation between the quadrature component ($Q(n)$) of the input signal and the local sequence; and wherein the processing unit is further configured to:
  generate a filtered in-phase part ($s_{M\_P\_I}(w)$) and a filtered quadrature part ($s_{M\_P\_Q}(w)$) of the third correlation signal by filtering, respectively, the in-phase part and the quadrature part of the third correlation signal;
  calculate a filtered modulus ($y_{mP}^{sp}(w)$) of the third correlation signal, proportional to the sum of the squares of the filtered in-phase part and of the filtered quadrature part of the third correlation signal;
  calculate a quantity (U) proportional to the ratio between a numerator equal to the difference between the filtered moduli of the second correlation signal and of the first correlation signal and a denominator equal to one from among the filtered moduli of the first, second, and third correlation signals, or else to an algebraic function of two or more of the filtered moduli of the first, second, and third correlation signals;
  compare said quantity with at least one first threshold (TH_U1) and one second threshold (TH_U2), the first threshold being a function of the ratio between the difference between the two values of the reference correlation function that are separated from the first secondary peak by the same distance that is present between the main peak and the first secondary peak, and the value of the first secondary peak, the second threshold being a function of the ratio between the difference between the two values of the reference correlation function that are separated from the second secondary peak by the same distance that is present between the main peak and the second secondary peak, and the value of the second secondary peak; and modify the time shifts between the sequence received and, respectively, the local sequence and the first and second replicas of the local sequence (A1($n$), A2($n$)), as a function of the mutual arrangement of said main peak and said first and second secondary peaks and of the arrangement of said quantity with respect to the interval ([TH_U1, TH_U2]) comprised between the first and second thresholds.

9. A method for estimating an alignment error ($\tau$) of an electronic receiver for a global navigation satellite system, said method comprising:

receiving, along a line-of-sight path, a navigation signal ($s_i(t)$) modulated with a sequence of a pseudo-random type, and receiving, along reflected paths, a number of replicas of the navigation signal;

generating an input signal ($s_i(n)$) of a numeric type as a function of the navigation signal and of the replicas of the navigation signal;

generating a local sequence ($cr_0(n)$);

time aligning the local sequence to the sequence received along the line-of-sight path;

generating a first replica of the local sequence (A1($n$)) and a second replica of the local sequence (A2($n$)); and generating, as a function of the input signal, a first correlation signal ($y_1(w)$; $y_{m1}(w)$) and a second correlation signal ($y_2(w)$; $y_{m2}(w)$), the first correlation signal indicating the correlation between the combination of the sequences received and the first replica of the local sequence, the second correlation signal indicating the correlation between the combination of the sequences received and the second replica of the local sequence;

wherein said generating a first correlation signal and a second correlation signal is carried out in open-loop mode, and said generating a first replica of the local sequence and a second replica of the local sequence is carried out, in a first operating mode, in such a way that said first and second replicas of the local sequence are both in advance with respect to the local sequence; said method further comprising:

determining a first estimate of an alignment error ($\tau$) between the sequence received along the line-of-sight path and the local sequence as a function of the first and second correlation signals and of the phase shifts between the local sequence and the first and second replicas of the local sequence; and wherein, in said first operating mode, the first replica of the local sequence (A1($n$)) is in advance with respect to the local sequence ($cr_0(n)$) by a first amount ($s_{A1}$), the second replica of the local sequence (A2($n$)) being in advance with respect to the local sequence by a second amount ($s_{A2}$), said first and second amounts being fixed; and wherein said determining a first estimate of alignment error comprises determining a time indicating the positions of a first point (($x_1^1(w)$, $y_1^1(w)$) and a second point ($x_2^1(w)$, $y_2^1(w)$)) of a reference correlation function, wherein said reference correlation function assumes values equal to the values of the first and second correlation signals ($y_1^1(w)$, $y_2^1(w)$; $y_{m1}(w)$, $y_{m2}(w)$), respectively with respect to a first reference point (($x_1^0(w)$, $y_1^0(w)$) and a second reference point ($x_2^0(w)$, $y_2^0(w)$)) of said reference correlation function, said first and second reference points being separated from the main peak of said reference correlation function by distances proportional, respectively, to the first and second amounts, said reference correlation function indicating the correlation function in the absence of multipaths of the sequence received along the line-of-sight path.

10. The method according to claim 9, wherein said reference correlation function has a predetermined profile between said first and second reference points (($x_1^0(w)$, $y_1^0(w)$); ($x_2^0(w)$, $y_2^0(w)$)).

11. The method according to claim 9, further comprising:
storing a calibration curve ($\tau_{cal}(\theta_j)$) indicating a part of the alignment error caused by an input stage of the electronic receiver; and calculating a second estimate ($\tau_{acc}$) of the alignment error between the sequence received and the local sequence ($cr_0(n)$), on the basis of the first estimate of the alignment error ($\tau$) and of the calibration curve.

12. The method according to claim 9, further comprising generating in closed-loop mode a third correlation signal ($y_{mP}^{sp}(w)$) indicating the correlation between the combination of the sequences received and the local sequence ($cr_0(n)$); and wherein said generating a first replica of the local sequence and a second replica of the local sequence is executed, in a second operating mode, in such a way that one of the first and second replicas of the local sequence (A1($n$), A2($n$)) is in advance with respect to the local sequence ($cr_0(n)$) by a third amount, the other being delayed with respect to the local sequence by a fourth amount, the third amount being a function of the time distance between the main peak of the reference correlation function and a first secondary peak of said reference correlation function, the fourth amount being a function of the time distance between said main peak and a second secondary peak of said reference correlation function; said method further comprising:

determining a first threshold (TH_U1), proportional to the ratio between the difference between the two values of the reference correlation function that are separated from the first secondary peak by the same distance that is present between the main peak and the first secondary peak, and the value of the first secondary peak;

determining a second threshold (TH_U2), proportional to the ratio between the difference between the two values of the reference correlation function that are separated from the second secondary peak by the same distance that is present between the main peak and the second secondary peak, and the value of the second secondary peak;

calculating a quantity (U) proportional to the ratio between a numerator equal to the difference between the second correlation signal and the first correlation signal and a denominator equal to one from among the first, second, and third correlation signals, or else to an algebraic function of two or more of the first, second, and third correlation signals;

comparing said quantity with said first and second thresholds (TH_U1, TH_U2); and modifying the time shifts between the sequence received and, respectively, the local sequence and the first and second replicas of the local sequence (A1($n$), A2($n$)), as a function of the mutual arrangement of said main peak and said first and second secondary peaks, and of the arrangement of said quantity with respect to the interval ([TH_U1, TH_U2]) comprised between the first and second thresholds.

13. The method according to claim 9, further comprising:
extracting an in-phase component (I(n)) and a quadrature component (Q(n)) of the input signal ($s_i$(n)); and
wherein said generating a first correlation signal ($y_1$(w); $y_{m1}$(w)) and a second correlation signal ($y_2$(w), $y_{m2}$(w)) comprises:
generating an in-phase part ($s_{d\_A1\_I}$(w)) and a quadrature part ($s_{d\_A1\_Q}$(w)) of the first correlation signal, which indicate the correlation between the first replica of the local sequence (A1(n)) and, respectively, the in-phase component of the input signal and the quadrature component of the input signal; and
generating an in-phase part ($s_{d\_A2\_I}$(w)) and a quadrature part ($s_{d\_A2\_Q}$(w)) of the second correlation signal, which indicate the correlation between the second replica of the local sequence (A2(n)) and, respectively, the in-phase component of the input signal and the quadrature component of the input signal;
said method further comprising:
generating a filtered in-phase part ($s_{M\_A1\_I}$(w)) and a filtered quadrature part ($s_{M\_A1\_Q}$(w)) of the first correlation signal by filtering, respectively, the in-phase part and the quadrature part of the first correlation signal;
generating a filtered in-phase part ($s_{M\_A2\_I}$(w)) and a filtered quadrature part ($s_{M\_A2\_Q}$(w)) of the second correlation signal by filtering, respectively, the in-phase part and the quadrature part of the second correlation signal;
calculating a filtered modulus of the first correlation signal ($y_{m1}$), proportional to the sum of the squares of the filtered in-phase part and of the filtered quadrature part of the first correlation signal;
calculating a filtered modulus of the second correlation signal ($y_{m2}$), proportional to the sum of the squares of the filtered in-phase part and of the filtered quadrature part of the second correlation signal; and
determining said first estimate of an alignment error ($\tau$) on the basis of the filtered moduli of the first and second correlation signals.

* * * * *